(12) United States Patent
Hawkes et al.

(10) Patent No.: US 10,104,544 B2
(45) Date of Patent: Oct. 16, 2018

(54) LTE-LEVEL SECURITY FOR NEUTRAL HOST LTE

(71) Applicant: QUALCOMM Incorporated, San Diego, CA (US)

(72) Inventors: Philip Hawkes, Valley Heights (AU); Anand Palanigounder, San Diego, CA (US); Rajat Prakash, San Diego, CA (US); Miguel Griot, La Jolla, CA (US); Manu Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/280,836

(22) Filed: Sep. 29, 2016

(65) Prior Publication Data

US 2017/0289799 A1 Oct. 5, 2017

Related U.S. Application Data

(60) Provisional application No. 62/318,676, filed on Apr. 5, 2016.

(51) Int. Cl.
  *H04W 12/06* (2009.01)
  *H04L 29/06* (2006.01)
  (Continued)

(52) U.S. Cl.
  CPC ............. *H04W 12/06* (2013.01); *H04L 63/06* (2013.01); *H04L 63/083* (2013.01);
  (Continued)

(58) Field of Classification Search
  CPC ... H04L 63/0823; H04L 63/06; H04L 63/083; H04L 63/0892; H04L 67/12; H04W 12/06; H04W 48/20; H04W 12/04; H04W 76/02
  See application file for complete search history.

(56) References Cited

U.S. PATENT DOCUMENTS

| 2013/0242965 A1 | 9/2013 | Horn et al. |
| 2014/0134980 A1 | 5/2014 | Singh et al. |

(Continued)

FOREIGN PATENT DOCUMENTS

| WO | WO-2012036992 A2 | 3/2012 |
| WO | WO-2015050892 A1 | 4/2015 |

OTHER PUBLICATIONS

International Search Report and Written Opinion—PCT/US2017/023677—ISA/EPO—dated Jun. 13, 2017.

(Continued)

*Primary Examiner* — Quan M Hua
(74) *Attorney, Agent, or Firm* — Loza & Loza, LLP

(57) ABSTRACT

Various features pertain to the authentication of mobile devices or other User Equipment. In some aspects, a Retail-based Neutral Host LTE is provided for use with Long Term Evolution (LTE) networks that, among other features, provides a WiFi Alliance HotSpot 2.0 (HS2.0) user experience using LTE technology for non-mobile network operator (non-MNO) Service Providers (SPs), while maintaining high security assurances as with LTE. That is, in some examples, Retail Neutral Host-LTE is configured to provide the same or similar security assurances as with MNO-based LTE. Moreover, retail Neutral Host-LTE offers options for provisioning credentials and authentication with the AAA that are analogous to the options for HS2.0, that is: username/password, SP-issued certificate, and pre-configured mobile device certificate. This is achieved, at least in part, while providing or ensuring that Retail Neutral Host-LTE security provides similar security assurances to MNO-based LTE.

30 Claims, 25 Drawing Sheets

(51) Int. Cl.
*H04W 12/04* (2009.01)
*H04W 88/02* (2009.01)

(52) U.S. Cl.
CPC ...... *H04L 63/0823* (2013.01); *H04L 63/0876* (2013.01); *H04L 63/0892* (2013.01); *H04W 12/04* (2013.01); *H04W 88/02* (2013.01)

(56) References Cited

U.S. PATENT DOCUMENTS

| | | |
|---|---|---|
| 2015/0223070 A1 | 8/2015 | Chhabra et al. |
| 2015/0264051 A1 | 9/2015 | Hoggan |
| 2016/0219038 A1* | 7/2016 | Stephenson ......... H04L 63/0823 |

OTHER PUBLICATIONS

Wifi Alliance: "Hotspot 2.0 (Release 1) Technical Specification," Jan. 1, 2012 (Jan. 1, 2012), XP055378094, Retrieved from the Internet: URL:http://www.wi-fi.org/file/hotspot-20-release-1-technical-specification-package-v100 [retrieved on Jun. 1, 2017], 25 pages.
Wi-Fi Alliance, Hotspot_2-0_(R2)_Technical_Specification_v1-1-0, Feb. 3, 2015, 207 pages, Wi-Fi Alliance.

* cited by examiner

*Exemplary Protocol Stack*

*Operations Performed in accordance with the Second Exemplary Authentication Procedure*

702 — At the mobile device, pre-configure a mobile device certificate, wherein a private key corresponding to the certificate is available only in secure processing and where the mobile device certificate is preconfigured with a chain of certificates to a mobile device trust anchor certificate issued by a certificate authority (CA) trusted by an OSU server.

704 — Mutually authenticate the UE and OSU via TLS with an OSU server certificate and mobile device certificate wherein authenticating the mobile device to the OSU component includes verifying that the mobile device certificate chains to the mobile device trust anchor CA certificate and where the TLS session terminates by enabling secure processing on the mobile device.

706 — Obtain a Service Provider (SP)-issued certificate at the mobile device via the OSU Server, using, e.g. Enrollment Over Secure Transport (EST), RFC 7030, where the corresponding private key is available only in secure processing and wherein the OSU server facilitates a Certification Authority (CA) to issue a SP-issued certificate.

708 — Forward the SP-issued certificate from the OSU server to the AAA server via a secure channel.

710 — At the AAA server, mutually authenticate the mobile device via EAP-TTLS where TLS uses an AAA certificate and the SP-issued certificate.

712 — Send an authentication confirmation from the AAA server back to the OSU server, which relays the confirmation to the mobile device to complete the authentication procedure.

*FIG. 7*

*Operations Performed in accordance with the Third Exemplary Authentication Procedure*

902 — At the mobile device, pre-configure a mobile device certificate, wherein a private key corresponding to the UE certificate is available only in secure processing and where the mobile device certificate is preconfigured with a chain of certificates to a mobile device trust anchor certificate issued by a certificate authority (CA) trusted by an OSU server.

904 — Mutually authenticate the UE and OSU via TLS with an OSU server certificate and mobile device certificate wherein authenticating the mobile device to the OSU component includes verifying that the mobile device certificate chains to the mobile device trust anchor CA certificate and where the TLS session terminates by enabling secure processing on the mobile device.

906 — At the OSU server, record the mobile device certificate.

908 — Forward the mobile device certificate from the OSU server to the AAA server via a secure channel for storage thereon.

910 — At the AAA server, authenticate the mobile device via EAP-TTLS where TLS uses an AAA certificate and the mobile device certificate.

912 — At the mobile device, authenticate the AAA Server via EAP-TTLS where TLS uses an AAA certificate and the mobile device certificate.

*FIG. 9*

*Further Exemplary Authentication Operations Performed by Components of a Service Provider (SP) network connected to a Wireless Communication Network* — 2100

Authenticate a user equipment (UE) to an online sign up (OSU) component of the SP network using a preconfigured user equipment (UE) certificate, wherein a private key corresponding to the UE certificate is available only in secure processing during authentication. — 2102

Using the OSU component, facilitate the provisioning of a SP-issued certificate to the UE, wherein the private key corresponding to the SP-issued certificate is available only in secure processing within the UE. — 2104

Using the OSU component, forward the SP-issued certificate to an authentication component of the SP network for subsequent authentication of the UE based on the SP-issued certificate. — 2106

*FIG. 21*

*Further Exemplary Authentication Operations Performed by Components of a Service Provider (SP) network connected to a Wireless Communication Network* — 2200

2202

Authenticate a user equipment (UE) to an online sign up (OSU) component of the SP network using a preconfigured user equipment (UE) certificate, wherein a private key corresponding to the UE certificate is available only in secure processing during authentication, the UE certificate is preconfigured with a chain of certificates to a UE trust anchor certificate issued by a certificate authority (CA) trusted by the OSU component, wherein authenticating the UE to the OSU component includes verifying that the preconfigured UE certificate chains to the UE trust anchor CA certificate, wherein authenticating the UE to the OSU component also employs Transport Layer Security (TLS) with a corresponding TLS session terminating in securing processing with the UE, the TLS session further serving to authenticate the OSU component with an OSU certificate.

2204

Using the OSU component, facilitate the provisioning of a SP-issued certificate to the UE, wherein the private key corresponding to the SP-issued certificate is available only in secure processing within the UE.

2206

Using the OSU component, forward the SP-issued certificate to an authentication component of the SP network for subsequent authentication of the UE based on the SP-issued certificate, wherein the authentication component is an Authentication, Authorization and Accounting (AAA) server equipped to perform mutual authentication with the UE using an AAA certificate along with the SP-issued certificate obtained from the OSU component in accordance with Extensible Authentication Protocol (EAP)-Tunneled Transport Layer Security (TTLS) method or EAP-Transport Layer Security (TLS) method.

*FIG. 22*

LTE-LEVEL SECURITY FOR NEUTRAL HOST LTE

CROSS-REFERENCE TO RELATED APPLICATIONS

This application claims priority based on U.S. Provisional Patent Application Serial No. 62/318,676, filed Apr. 5, 2016, for "LTE-LEVEL SECURITY FOR NEUTRAL HOST LTE," which is assigned to the assignee hereof and incorporated by reference herein in its entirety.

BACKGROUND

Field of the Disclosure

Various features relate to wireless communication networks and to security procedures for use in authenticating mobile devices or other User Equipment (UE) to networks equipped for use in accordance Long-Term Evolution (LTE) standards.

Description of Related Art

Wireless communication networks such LTE networks employ various types of security schemes. By way of example, the WiFi Alliance HotSpot 2.0 (Release 2) Technical Specification v1.1.0 provides various security features. HotSpot 2.0 (herein-after HS2.0) includes an online sign up (OSU) process by which a mobile device registers with a Service Provider (SP), enabling a user to select a plan for obtaining network access, and is then provisioned with the credentials necessary to securely connect to an Access Network (AN). The OSU process is facilitated by the SP's OSU Server. The resulting credentials are provided to the Authentication, Authorization and Accounting server (AAA) of the SP. The OSU process begins by establishing a Transport Layer Security (TLS) connection between the mobile device and the OSU Server. The remaining provisioning steps can depend on the mobile device credentials that the AAA uses to authenticate the mobile device. HS2.0 supports three main options for mobile device credentials. Table I, below, summarizes these options, as well as summarizing the OSU procedures for use with these particular credentials. Note that some of these methods exploit one or more of Extensible Authentication Protocol (EAP), with the EAP-TLS (Transport Layer Security) EAP Method and/or EAP-TTLS (Tunneled TLS) method. Other acronyms used include HLOS for High Level Operating System, CA for Certificate Authority and EST for Enrollment Over Secure Transport. MSCHAPv2 refers to a particular Challenge-Handshake Authentication Protocol (CHAP) provided by Microsoft™. RFC 7030 refers to Request for Comment (RFC) 7030 of the Internet Engineering Task Force (IETF) of October 2013.

TABLE I

| Mobile Device Credentials | Authentication of Mobile device and OSU Server | OSU Server actions | EAP method used by AAA |
|---|---|---|---|
| METHOD 1: | | | |
| Username & password | TLS with OSU Server certificate | OSU Server selects and configures username & password | EAP-TTLS: TLS with AAA certificate, and MSCHAPv2 with username & password |
| METHOD 2: | | | |
| SP-issued certificate whose private key is available only to mobile device HLOS. | TLS with OSU Server certificate | Facilitates a CA to issue a SP-issued certificate. EST (RFC 7030) may be used. | EAP-TLS: TLS uses AAA certificate & SP-issued certificate |
| METHOD 3: | | | |
| Pre-configured mobile device certificate | TLS with OSU Server certificate & mobile device certificate | Forwards mobile device certificate to AAA | EAP-TLS: TLS uses AAA certificate & mobile device Certificate |

The mobile device's interaction with the OSU Server occurs only as required to establish the mobile device credentials in the first column of Table I. These mobile device credentials typically have a long lifetime. Once the mobile device credentials are established, the mobile device credentials are then used by the AAA to authenticate the mobile device when it requests access from the Service Provider. The frequency of the authentication with the AAA depends on a variety of factors, but typically occurs many times within the lifetime of the mobile device credential.

The implementation of credential storage and credential processing is outside the scope of HS2.0. In the cases of username/password credentials and SP-issued certificates, there is no authentication of the mobile device to the OSU Server in HS2.0, and consequently the OSU Server can make no assumptions about the implementation of the credential storage and credential processing. In the case of a pre-configured mobile device certificate, the OSU Server might be able to make some assumptions about implementation of the credential storage and credential processing if the mobile device certificate issuance process included some assurance about the implementation. However, in general it is assumed in HS2.0 that the credentials are stored and processed by the mobile device HLOS. The storage and processing provided by the HLOS may be vulnerable to attacks. The complexity of most or all HLOS means that, despite efforts to secure the HLOS, the HLOS will likely always be vulnerable to some attacks.

There is a need in the art to provide improved security for systems similar to HS2.0. In particular, it would be desirable to provide options for provisioning credentials and authentication with the OSU and AAA that are analogous to the options for HS2.0 while also providing security assurances associated with a more secured environment. Herein, an exemplary system or procedure directed to these ends is referred to as Retail-based Neutral Host LTE authentication.

SUMMARY

In one aspect, a method operational in a service provider (SP) network connected to a wireless communication network includes: authenticating a user equipment (UE) to an online sign up (OSU) component of the SP network using a preconfigured UE certificate, wherein a private key corresponding to the UE certificate is available only in secure processing during authentication; and forwarding the UE certificate from the OSU component to an authentication component of the SP network for subsequent authentication of the UE based on the UE certificate.

In another aspect, a device includes: a processing circuit of an OSU component of a SP network, the processing circuit configured to authenticate a UE to the OSU component of the SP network using an UE certificate obtained from the UE, wherein a private key corresponding to the UE certificate is available only in secure processing during authentication; and forward the UE certificate to an authentication component of the SP network for subsequent authentication based on the UE certificate.

In yet another aspect, a method operational within components connected to a wireless communication network includes: authenticating a UE to an OSU component of an SP network using a preconfigured UE certificate, wherein a private key corresponding to the UE certificate is available only in secure processing during authentication; facilitating, using the OSU component, the provisioning of a SP-issued certificate to the UE, wherein the private key corresponding to the SP-issued certificate is available only in secure processing within the UE, and forwarding, using the OSU component, the SP-issued certificate to an authentication component of the SP network for subsequent authentication of the UE based on the SP-issued certificate.

In still yet another aspect, a device includes: a processing circuit of a user equipment (UE) for use with a wireless communication network, the processing circuit configured to authenticate the UE to an online sign up (OSU) component of a service provider (SP) network using a preconfigured certificate, wherein a private key corresponding to the preconfigured certificate is available only in secure processing during authentication; authenticate the UE to an authentication component of the SP network to obtain a key; and secure communications between the UE and the SP network based on the key.

BRIEF DESCRIPTION OF THE DRAWINGS

FIG. 7 further illustrates the second exemplary authentication procedure in accordance with the Retail-based Neutral Host LTE authentication protocol.

FIG. 9 further illustrates the third exemplary authentication procedure in accordance with the Retail-based Neutral Host LTE authentication protocol.

FIG. 21 summarizes exemplary procedures for use in authentication with a preconfigured UE certificate wherein an OSU component facilitates the provisioning of an SP-issued certificate to the UE.

FIG. 22 further summarizes exemplary procedures for use with the authentication procedure of FIG. 21.

DETAILED DESCRIPTION

Figure 1:
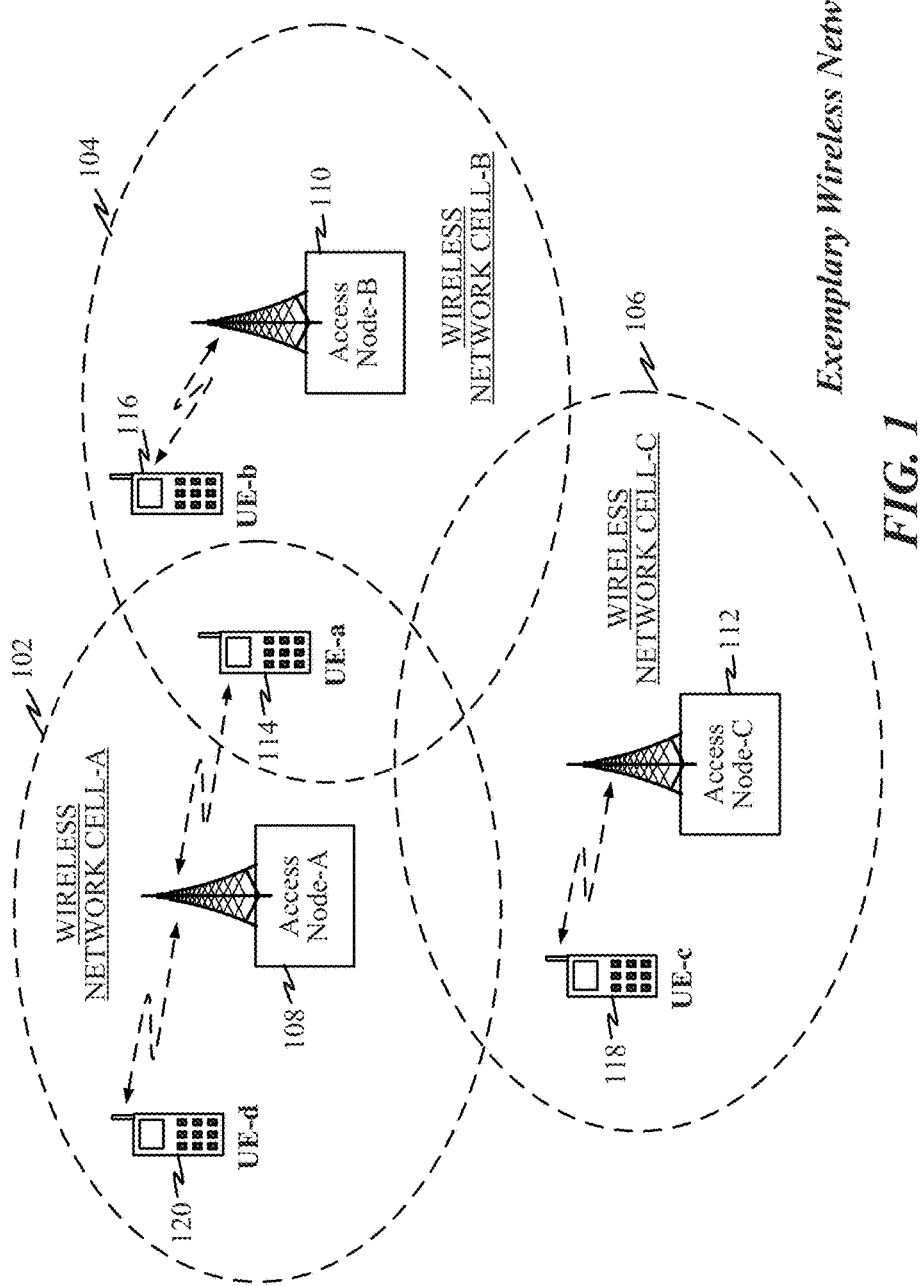
FIG. 1 illustrates an exemplary wireless network in which authentication may be implemented to authenticate a user equipment (UE) in accordance with a Retail-based Neutral Host LTE authentication protocol.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Several novel features pertain to devices and methods for use with wireless communication networks. In particular, a Retail-based Neutral Host LTE (hereafter, Retail NH-LTE) procedure, protocol or system is described herein for use with LTE or other networks that, among other features, provides a WiFi Alliance HotSpot 2.0 (HS2.0) user experience using LTE technology for non-mobile network operator (non-MNO) SPs, while maintaining high security assurances as with LTE. That is, Retail NH-LTE is configured to provide the same or similar security assurances as with MNO-based LTE. (Note that a "Neutral Host" is typically a WiFi or other data network infrastructure that is shareable among multiple service providers, which provide WiFi or other data access to customers. The term "neutral" is typically used to indicate that the network architecture is designed for compatibility with different mobile network operators or with other providers of data streams.)

The retail NH-LTE systems and procedures described herein provide options for provisioning credentials and for authentication with the OSU and the Authentication, Authorization and Accounting server (AAA) that are analogous to the options for HS2.0 (discussed above with Table I), that is: username/password, SP-issued certificate and/or pre-configured mobile device certificate. This may be achieved while providing or ensuring that Retail NH-LTE security provides the same or similar security assurances as with MNO-based LTE.

Note also that MNO-based LTE uses pre-provisioned symmetric keys processed in secured environments such as a Universal Integrated Circuit Card (UICC) issued by the MNO to the subscriber. The MNO trusts the security of the UICC as a result of the contractual obligations on the UICC manufacturer. The subscriber trusts MNO to provide a secure UICC. This contrasts with the less-secure storage and processing offered by the HLOS in HS2.0. Exemplary systems and methods described herein address this problem, at least in part, by providing procedures for provisioning credentials and authentication with the OSU and AAA that are analogous to the options for HS2.0 while providing security assurances associated with a secured environment.

Broadly speaking, exemplary implementations of Retail NH-LTE provide three credentialing methods, procedure or options, as summarized in TABLE II.

TABLE II

| Mobile Device Credentials | Authentication of Mobile device and OSU Server | OSU Server actions | EAP method used by AAA |
|---|---|---|---|
| METHOD 1: | | | |
| Username & password, & pre-configured mobile device certificate. | TLS with OSU Server certificate & mobile device certificate whose private key is available only in secure processing. | Records mobile device certificate. Selects and configures username & password. Forwards the username, password and the mobile device certificate to the AAA via a secure channel. | EAP-TTLS: TLS uses AAA certificate and mobile device certificate MSCHAPv2 with username & password. |
| METHOD 2: | | | |
| SP-issued certificate whose private key is available only in secure processing. | TLS with OSU Server certificate & mobile device certificate whose private key is available only in secure processing. | Facilitates a CA to issue a SP-issued certificate. EST (RFC 7030) may be used. | EAP-TLS: TLS uses AAA certificate & SP-issued certificate. |
| METHOD 3: | | | |
| Pre-configured mobile device certificate whose private key is available only in secure processing. | TLS with OSU Server certificate & mobile device certificate. | Forwards mobile device certificate to AAA. | EAP-TLS: TLS uses AAA certificate & mobile device Certificate. |

As such, in at least some examples. Retail NH-LTE adds the following to HotSpot 2.0 security:

Each mobile device is pre-configured with a mobile device certificate and a chain of certificates to a mobile device trust anchor CA certificate. (This is preferably a requirement of the system.) The corresponding private key is protected for confidentiality and integrity, and available only to secure processing, which may be a mode of operation of the hardware (e.g. ARM™ TrustZone™) or distinct hardware from the apps processor (e.g. Secure Element). (This too is preferably a requirement of the system.) The mobile device certificate provides assurance regarding confidentiality and integrity of storage and processing on the mobile device.

All credential options have the mobile device authenticate itself to the OSU server using its mobile device certificate in the TLS handshake. The OSU server verifies that the mobile device certificate chains to a mobile device trust anchor CA certificate which is trusted by the OSU Server. Alternatively, the OSU Server has other mechanisms for verifying that the mobile device certificate is legitimate. This verification provides the OSU server with assurance regarding confidentiality and integrity of information exchanged with the mobile device.

When username and password are to be used in AAA authentication, then (1) the OSU Server also records the mobile device certificate used during OSU and provides this mobile device certificate (in addition to the username and password) to the AAA and (2) during EAP-TTLS with the AAA, the mobile device authenticates itself using the certificate as part of the TLS handshake, in addition to the username/password authentication using MSCHAPv2.

When an SP-issued certificate is used in authenticating to the AAA, then the private key is generated, stored and processed by secure processing in the mobile device.

The trust anchor CA certificates for the OSU Server are also stored with integrity protection on the mobile device. (This too is preferably a requirement of the system.) Note that the examples set forth herein are not intended to describe in detail all aspects of the overall system. Features not described herein may be provided by those of ordinary skill in the art without undue experimentation. For example, the following are not addressed by this disclosure: 1) the mechanisms for configuring the mobile device certificate to the mobile device: 2) the implementation details for assuring the confidentiality and integrity of storage and processing with the secure processing; and 3) the implementation details for assuring that private keys of certificates are generated (where applicable), stored and processed by secure processing in the mobile device.

Among other technical advantages or benefits of the systems and procedures described herein (when using at least some of the systems and procedures), SPs may have the assurance that the mobile device credentials (used for authentication with the AAA) are available only within secure processing on the mobile device. This is a higher level of assurance when compared to HotSpot 2.0 and is more in line with the level of assurance offered by MNO LTE (using UICC). Still further, when using at least some of the systems and procedures described herein, a higher level of assurance is provided with relatively minimal changes to HotSpot 2.0 OSU Servers and AAAs. As such, implementers of HotSpot 2.0 OSU servers and AAA servers can implement Retail NH-LTE OSU Servers and AAAs with little additional effort or resources.

Exemplary Operating Environment

FIG. 1 illustrates an exemplary wireless network in which Retail NH-LTE may be implemented. The wireless network may include a plurality of wireless network cells 102, 104, and 106 in which a corresponding access node 108, 110, and 112 in each cell provides wireless connectivity/service to user equipment/devices UEs 114, 116, 118, 120 in the cell. A UE device may include a mobile device, mobile phone, client device, wireless device, communication device, computing device, etc., capable of transmitting and receiving signals to/from an access node. An access node may include a cell node (eNodeB or eNB), a base station, etc., that connects to a cellular operator's network and eventually connects to other networks (e.g., internet, telephone network, etc.). In this example, a first access node A 108 may communicate with a first UE 114 within a first wireless cell 102. Similarly, a second access node B 110 may communicate with a second UE 116 within a second wireless cell 104.

Figure 2:
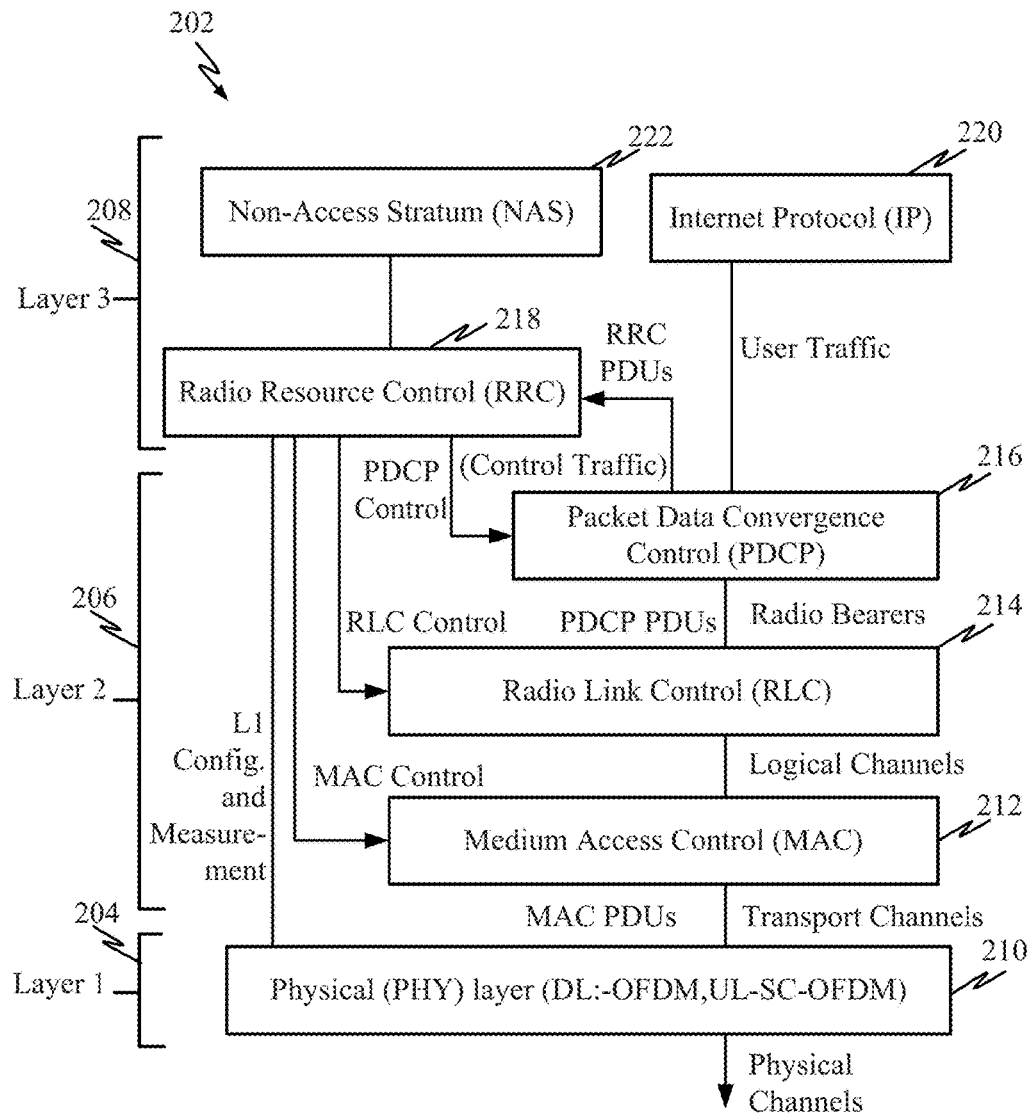
FIG. 2 illustrates an exemplary protocol stack that may be implemented for wireless transmissions over the exemplary wireless network of FIG. 1.

FIG. 2 illustrates an exemplary protocol stack that may be implemented for wireless transmissions over the exemplary wireless network of FIG. 1. In this example, the protocol stack 202 may include three layers 204, 206, and 208. A first layer 204 may include a physical (PHY) layer 210. A second layer 206 may include a Medium Access Control (MAC) layer 212, a Radio Link Control (RLC) layer 214, and/or a Packet Data Convergence Control layer 216. A third layer 208 may include a Radio Resource Control (RRC) layer 218, an Internet Protocol (IP) layer 220, and/or a Non-Access Stratum (NAS) layer 222. The PHY layer 210 may serve to carry all information from the transport channels of the MAC layer 212 over the air interface. The PHY layer 210 may also be used to perform link adaptation, power control, cell search, and other measurements for the RRC layer 218. The MAC layer 212 may provide logical channels to the RLC layer 214 that it multiplexes into the physical layer transport channels.

Figure 3:
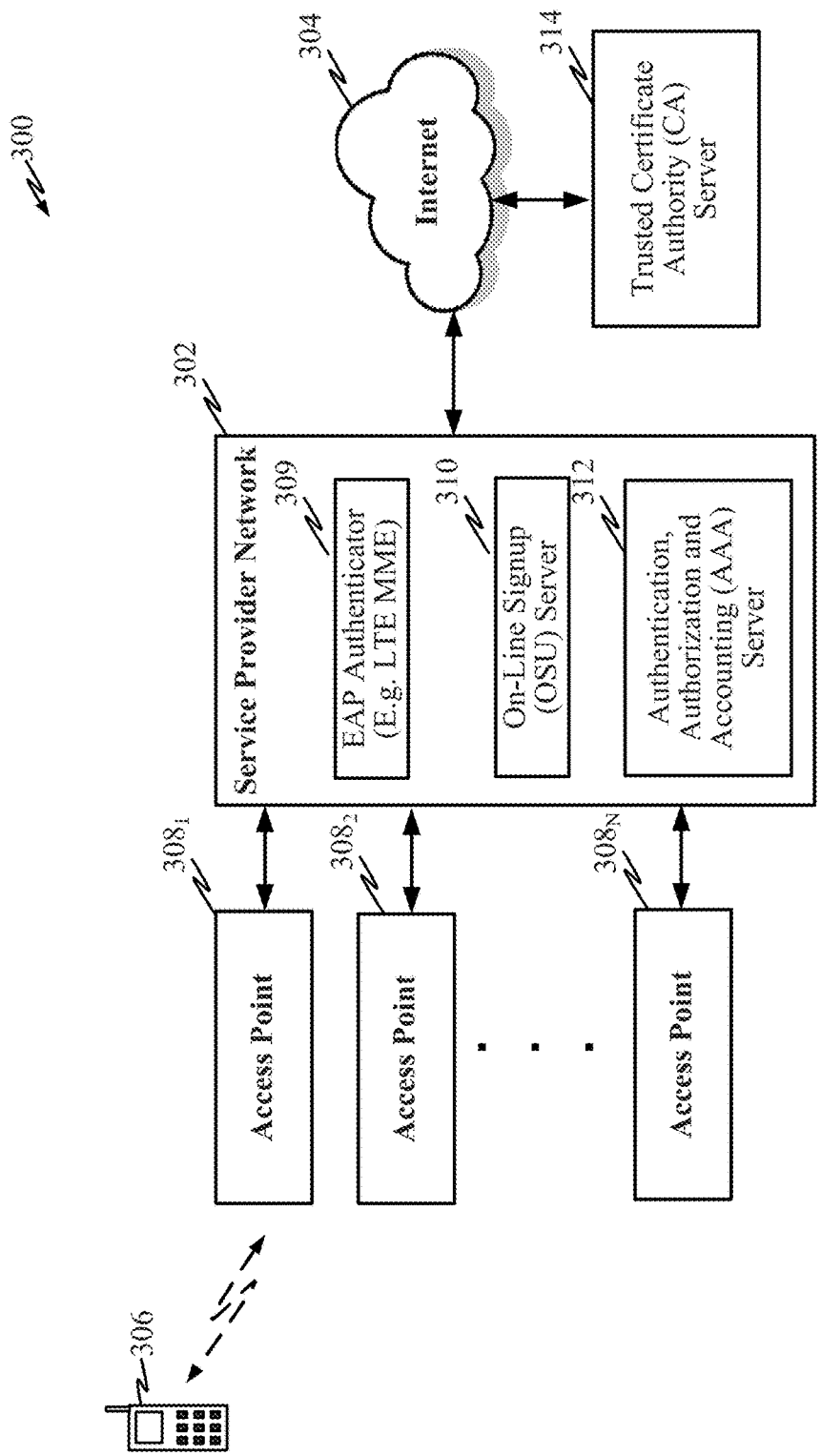
FIG. 3 further illustrates an exemplary wireless network in which authentication may be implemented to in accordance with the Retail-based Neutral Host LTE authentication protocol.

FIG. 3 illustrates an exemplary wireless communication network 300 that may incorporate the features of FIGS. 1 and 2 and may further include a Service Provider Network (SP) 302 equipped to provide access to the Internet 304 for a mobile device (or other UE) 306 via one or more access points $308_1$-$308_N$. The SP network 302 includes, in this example, an EAP Authenticator (e.g. an LTE Mobility Management Entity (MME)) 309, an on-line signup (OSU) server 310 and an AAA Server 312. The EAP Authenticator 309, OSU Server 310 and AAA Server 312 can be in the same local area network as the Access Points $308_1$-$308_N$ or may be located elsewhere and accessed via the Internet 304 (the latter option is not shown in FIG. 3). As may be appreciated, the service provider network may include various other components not specifically shown in FIG. 3. Among the many systems or servers that may be accessed via the Internet 304 is a Trusted Certificate Authority (CA) server 314. As will be explained, these components may be used to provide or facilitate the aforementioned Retail NH-LTE.

Exemplary Authentication Methods and Procedures

Figure 4:
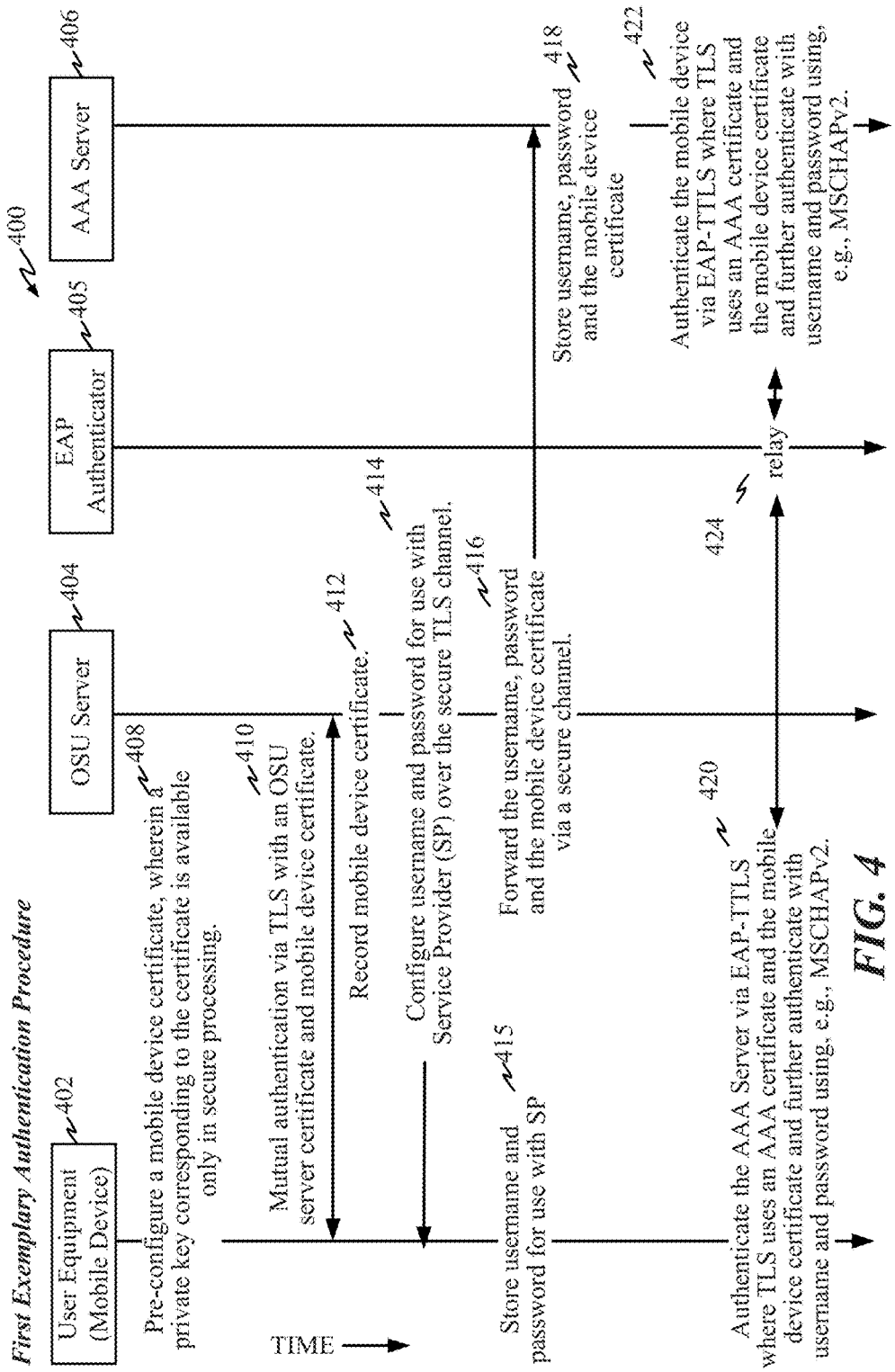
FIG. 4 further illustrates a first exemplary authentication procedure in accordance with the Retail-based Neutral Host LTE authentication protocol.

FIG. 4 summarizes the first method for authentication 400 in accordance with Retail NH-LTE, where some of the operations are performed by the mobile device (or other UE) 402, others are performed by an OSU server 404 of an SP network, others are performed by an EAP Authenticator 405 of an SP network, and still others are performed by an AAA server 406 of the SP network. Beginning at 408, the mobile device is pre-configured with a mobile device certificate, where a private key corresponding to the mobile device certificate is available only in secure processing during authentication. As noted above, the private key should be protected for the purposes of confidentiality and integrity and hence be available only to secure processing. To this end, the mobile device certificate may be preconfigured with a chain of certificates to a mobile device trust anchor certificate issued by a CA trusted by the OSU component (such as the CA of FIG. 3). Alternatively, the OSU Server has other mechanisms for verifying that the mobile device certificate is legitimate. The mobile device certificate thus provides assurance regarding confidentiality and integrity of storage and processing on the mobile device.

At 410, the OSU server authenticates the mobile device via TLS with an OSU server certificate and the mobile device certificate, whose private key is available only in secure processing during authentication. This includes verifying that the mobile device certificate chains to the aforementioned mobile device trust anchor CA certificate, or applying an alternate verification mechanism. Note that the TLS session is established by secure processing within the mobile device. At 412, the OSU server records the mobile device certificate. At 414, the OSU Server configures, to the mobile device, a username and password for use with the SP. At 415, the mobile device stores the username and password for use with the SP. At 416, the OSU server sends or forwards the username, password and the mobile device certificate to the AAA server 406 via one or more secure channels. At 418, the AAA Server stores the username, password and mobile device certificate. At 420 and 424, the mobile device and the AAA server perform mutual authentication via EAP-TTLS where the TLS uses an AAA certificate and the mobile device certificate and further authenticates with the username and password using a Challenge-Handshake Authentication Protocol (CHAP) such as MSCHAPv2 or similar. The EAP Authenticator 405 relays EAP messages between the mobile device and AAA Server as shown at 424. After successful authentication, the AAA provides the EAP Authenticator with a symmetric key for subsequent authentication of the mobile device with Access Points $308_1$-$308_N$ (these details are not shown in FIG. 4).

Figure 5:
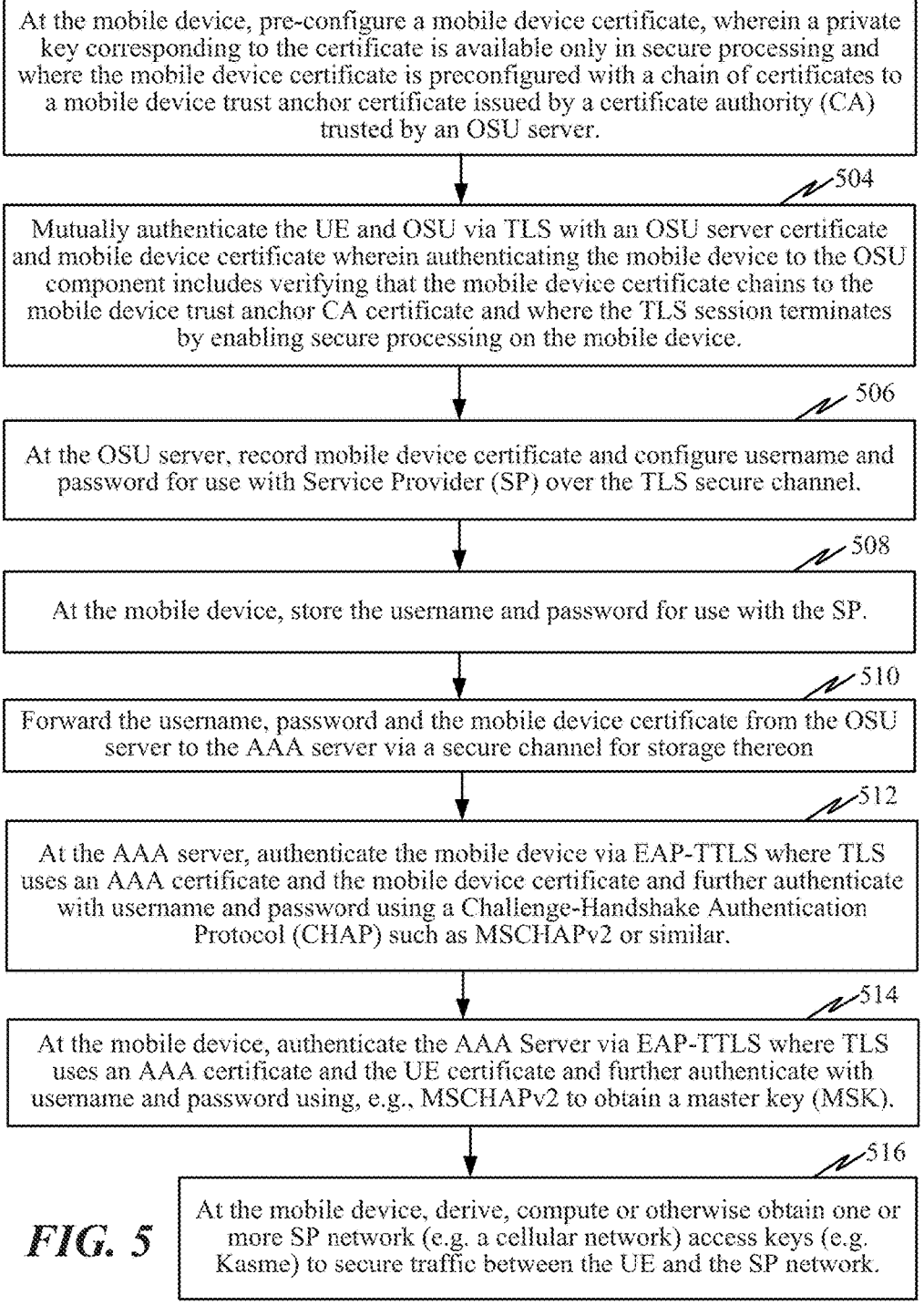
FIG. 5 further illustrates the first exemplary authentication procedure in accordance with the Retail-based Neutral Host LTE authentication protocol.

FIG. 5 illustrates selected aspects of the first authentication method or procedure via a flowchart. Briefly, at 502, a mobile device or other UE pre-configures a mobile device certificate, wherein a private key corresponding to the certificate is available only in secure processing during authentication and where the mobile device certificate is preconfigured with a chain of certificates to a mobile device trust anchor certificate issued by a certificate authority (CA) trusted by an OSU server. At 504, the mobile device and the OSU mutually authenticate via TLS with an OSU server certificate and mobile device certificate wherein authenticating the mobile device to the OSU component includes verifying that the mobile device certificate chains to the mobile device trust anchor CA certificate and where the TLS session terminates by enabling secure processing on the mobile device. At 506, the OSU server records mobile device certificate and configure username and password for use with Service Provider (SP) over the TLS secure channel. At 508, the mobile device stores the username and password for use with the SP. At 510, the username, password and the mobile device certificate are forwarded from the OSU server to an AAA server via a secure channel for storage thereon. At 512, the AAA server authenticates the mobile device via EAP-TTLS where TLS uses an AAA certificate and the mobile device certificate and further authenticates with username and password using a CHAP such as MSCHAPv2 or similar. At 514, the mobile device also authenticates the AAA Server via EAP-TTLS where TLS uses an AAA certificate and the mobile device certificate and further authenticates with username and password using, e.g., MSCHAPv2, to obtain a master key (MSK). At 516, the mobile device derives, computes or otherwise obtains one or more SP network (e.g. a cellular network) access keys (e.g. Kasme keys) to secure traffic between the UE and the SP network.

Figure 6:
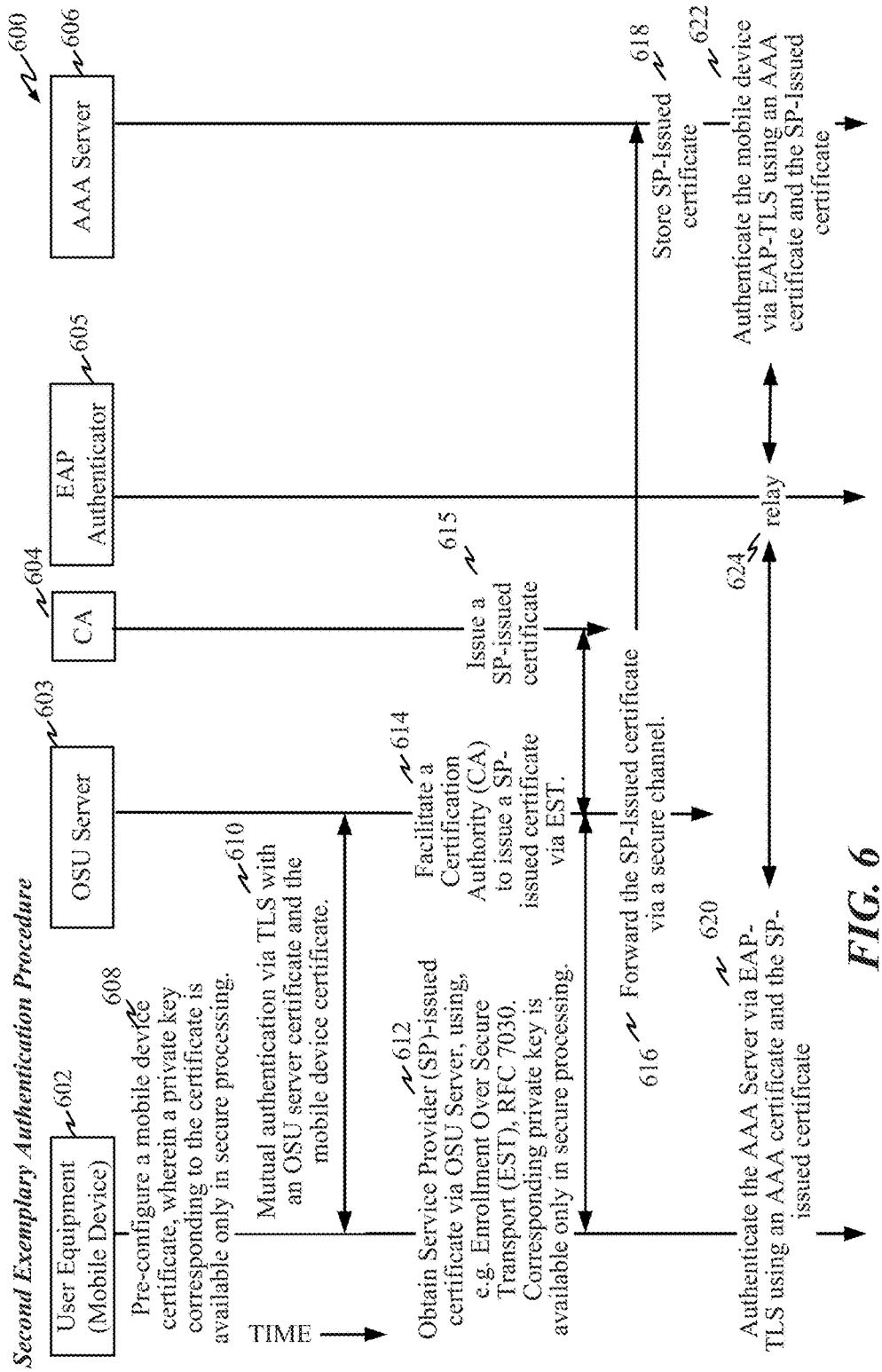
FIG. 6 further illustrates a second exemplary authentication procedure in accordance with the Retail-based Neutral Host LTE authentication protocol.

FIG. 6 summarizes the second method for authentication 600 in accordance with Retail NH-LTE, where, again, some of the operations are performed by a mobile device (or other UE) 602, others are performed by an OSU server 603 of an SP, others are performed by an trusted Certificate Authority (CA) 404 (such as the one shown in FIG. 3), others are performed by an EAP Authenticator 405 of an SP network, and still others are performed by an AAA server 606. Beginning at 608 and 610, these operations may be identical to those of 408 and 410 of FIG. 4, respectively, discussed above. At 612, 614 and 615, the mobile device is provisioned with a Service Provider (SP)-issued certificate, wherein a private key corresponding to the SP-issued certificate is available only in secure processing within the UE, and wherein the OSU server facilitates the CA to issue the certificate to the mobile device via using, e.g., Enrollment Over Secure Transport (EST) specified in Request for Comment (RFC) 7030 of the Internet Engineering Task Force (IETF) of October 2013. That is, in at least some examples, the OSU facilitates the CA to issue the SP certificate by performing or initiating an EST procedure in conjunction with the CA, such as the EST procedure described in RFC 7030. In this regard, in order to facilitate the CA to issue the SP certificate, the OSU may be equipped to perform the functions of an EST server as described in RFC 7030. RFC 7030 pertains to certificate enrollment for clients using Certificate Management over CMS (CMC) messages over a secure transport. The EST profile or procedure described therein provides a certificate management protocol targeting Public Key Infrastructure (PKI) clients that need or want to acquire client certificates and associated CA certificates. EST supports client-generated public/private key pairs as well as key pairs generated by the CA.

At 616, the OSU server forwards or otherwise sends the SP-issued certificate to the AAA server via a secure channel. At 618, the AAA Server stores the SP-issued certificate. At 620 and 622, the mobile device and AAA server perform mutual authentication via EAP-TLS where the TLS uses an AAA certificate and the SP-issued certificate. The EAP Authenticator relays EAP messages between the mobile device and AAA Server as shown at 624. After successful authentication, the AAA provides the EAP Authenticator with a symmetric key for subsequent authentication of the mobile device with Access Points $308_1$-$308_N$ (these details are not shown in FIG. 6), thus completing the authentication procedure.

FIG. 7 illustrates selected aspects of the second authentication method or procedure via a flowchart. Briefly, at 702, a mobile device or other UE pre-configures a mobile device certificate, wherein a private key corresponding to the certificate is available only in secure processing during authentication and where the mobile device certificate is preconfigured with a chain of certificates to a mobile device trust anchor certificate issued by a certificate authority (CA) trusted by an OSU server. At 704, the mobile device and the OSU mutually authenticate via TLS with an OSU server certificate and mobile device certificate wherein authenticating the mobile device to the OSU component includes verifying that the mobile device certificate chains to the mobile device trust anchor CA certificate and where the TLS session terminates by enabling secure processing on the mobile device. At 706, the mobile device obtains a Service Provider (SP)-issued certificate via the OSU Server, using, e.g. Enrollment Over Secure Transport (EST), RFC 7030 where the corresponding private key is available only in secure processing and wherein the OSU server facilitates a Certification Authority (CA) to issue a SP-issued certificate by initiating or performing EST procedures in conjunction with the CA. At 708, the SP-issued certificate is forwarded from the OSU server to an AAA server via a secure channel for storage thereon. At 710, the AAA server authenticates the mobile device via EAP-TTLS using an AAA certificate and the SP-issued certificate, and the UE authenticates the AAA, i.e. mutual authentication is performed. At 712, the mobile device also authenticates the AAA Server via EAP-TTLS using the AAA certificate and the SP-issued certificate.

Figure 8:
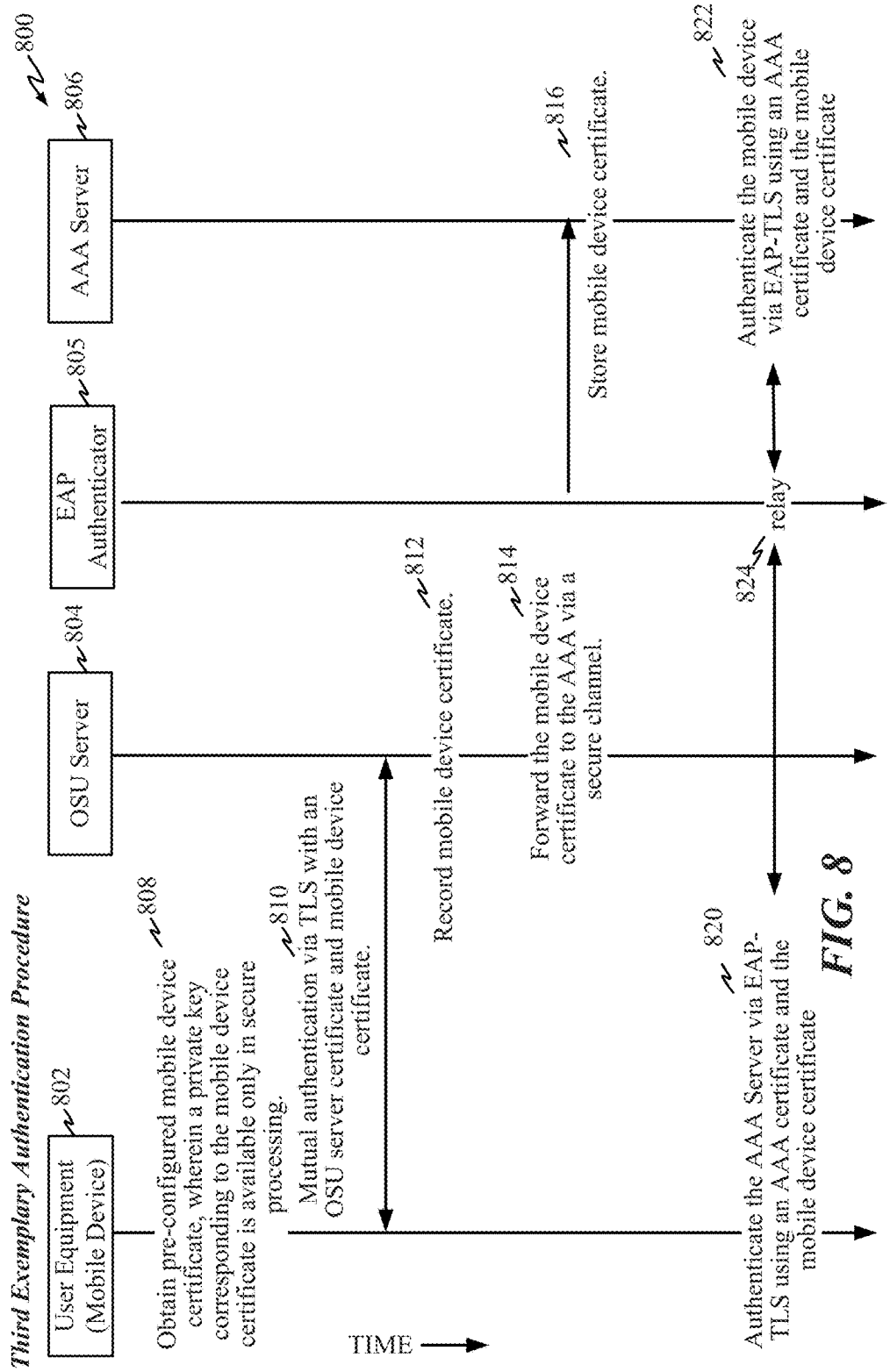
FIG. 8 further illustrates a third exemplary authentication procedure in accordance with the Retail-based Neutral Host LTE authentication protocol.

FIG. 8 summarizes the third method for authentication 800 in accordance with Retail NH-LTE, where, again, some of the operations are performed by a mobile device (or other UE) 802, others are performed by an OSU server 804 of an SP network, others are performed by an EAP Authenticator 405 of an SP network, and still others are performed by an AAA server 806 of the SP network. Beginning at 808, 810, and 812, operations may be identical to those of 408, 410 and 412 of FIG. 4, respectively, as described above. At 814, the OSU server sends or forwards the mobile device certificate to the AAA server 806 via a secure channel. At 816, the AAA server records the mobile device certificate. At 820 and 822, the mobile device and AAA server perform mutual authentication using EAP-TLS where the TLS uses an AAA certificate and the mobile device certificate. The EAP Authenticator relays EAP messages between the mobile device and AAA Server as shown at 824. After successful authentication, the AAA provides the EAP Authenticator with a symmetric key for subsequent authentication of the mobile device with Access Points $308_1$-$308_N$ (these details are not shown in FIG. 8), thus completing the overall authentication procedure.

FIG. 9 illustrates selected aspects of the third authentication method or procedure via a flowchart. Briefly, at 902, a mobile device or other UE pre-configures a mobile device certificate, wherein a private key corresponding to the certificate is available only in secure processing during authentication and where the mobile device certificate is preconfigured with a chain of certificates to a mobile device trust anchor certificate issued by a certificate authority (CA) trusted by an OSU server. At 904, the mobile device and the OSU mutually authenticate via TLS with an OSU server certificate and mobile device certificate wherein authenticating the mobile device to the OSU component includes verifying that the mobile device certificate chains to the mobile device trust anchor CA certificate and where the TLS session terminates by enabling secure processing on the mobile device. At 906, the mobile device records the mobile certificate. At 908, the mobile certificate is forwarded from the OSUL server to an AAA server via a secure channel for storage thereon. At 910, the AAA server authenticates the mobile device via EAP-TTLS using an AAA certificate and the mobile certificate. At 912, the mobile device also authenticates the AAA Server via EAP-TTLS using the AAA certificate and the mobile certificate.

In the following section, various illustrative details are set forth regarding exemplary procedures for use with credentialing, EAP and OSU, etc. These details are merely illustrative and not limiting.

Exemplary Procedures for Credentialing, EAP and OSU

The UE may be configured to provide a device certificate for online provisioning (where the device certificate is tied to the device and used by the Service Provider to uniquely verify device). The device certificate can be provisioned in the UE using one or more of the following procedures or mechanisms: provisioned during manufacturing; provisioned in the UE during manufacture by the device vendor; or provisioned securely using an out of band mechanism, e.g., an application on the device. The device credentials, once successfully authenticated, do not necessarily entitle the device to receive normal services, but rather access may still be restricted to provisioning only. The device certificate may have a chain to a trust anchor CA certificate which is trusted by, at least, the OSU and AAA servers. When the UE accesses the network for provisioning with the device certificate, the UE is authenticated with a trust anchor and security keys are put into place using EAP-TLS (or similar) and, if authentication is successful, a packet data network (PDN) connection for provisioning is established with security context.

The device certificate may be used in conjunction with a subscription certificate, which is used by the Service Provider to authenticate the subscriber and grant access to the user via a NH Network. Subscription certificates may be provisioned securely in the UE using one or more of the following procedures or mechanisms: provisioned during manufacture (e.g. subscription certificates for EAP-TLS may be provisioned in the UE during manufacture by the device vendor): provisioned securely using an out of band mechanism, e.g., an application on the device: and provisioned in band using an OSU procedure. Typically, a UE is required to have a device certificate in order to initiate an Attach to the NH network for OSU.

Insofar as EAP authentication is concerned, in some examples, each EAP authentication involves executing an EAP method (e.g., EAP-TLS. EAP-TTLS, EAP-AKA', etc.). The UE and the EAP authentication server may use EAP method negotiation to dynamically select a method during network access authentication. For device and/or user authentication based on certificates (such as X.509, 802.1ar, etc.), the UE is configured to support EAP-TLS. For user authentication based on username and password, the UE is configured to support EAP-TTLS with MS-CHAP v2. For user authentication with a 3GPP Operator based on USIM, the UE is configured to support EAP-AKA'. For EAP methods that utilize server certificates, the UE may check the revocation status of an AAA server's X.509 certificate at the time of network access authentication. The UE may be configured to use—and the PSP AAA may be configured to support—Online Certificate Status Protocol (OCSP) extensions during a TLS handshake. An EAP layer may be responsible for negotiation of the EAP authentication method to be used, mutual authentication and key agreement. EAP authentication may then deliver a Master Session Key (MSK) from which a base key $K_{ASME}$ is derived (where $K_{ASME}$ refers to—Key Access Security Management Entry).

In a particular example, an EAP-TLS client in the UE is configured to support at least one cryptographic suite and/or protocol and the EAP-TLS Server (or PSP AAA server) provides at least a minimum level of support for that cryptographic suite. If the EAP-TLS terminates with EAP-Failure, the UE and the authenticator in the NH-MME (such as the MME of FIG. 3) perform a disconnection procedure. Furthermore, if the UE receives network rejection information via EAP Notification, then the UE detaches from the NH network. The UE parses the server's X.509 certificate sent to it by the AAA during EAP-TLS. The UE verifies that a PSP fully qualified domain name (FQDN) is a suffix match of the domain name in at least one of a set of suitable extensions (such as the DNSName SubjectAltName extensions of TLS). If a SubjectAltName of type DNSName is not present, then the domain name from the FQDN may be set as a suffix match to a CommonName portion of a SubjectName (of TLS). If neither of these conditions holds, then verification fails. If the EAP session is completed successfully (i.e. the UE receives an EAP Success value), the UE may then act depending on the realm match or the mismatch. In case of realm match, i.e. when a PSP FQDN extracted from an AAA certificate matches the expected realm of the PSP, when receiving EAP Success, the UE then continues the connection procedure. Otherwise, in case of realm mismatch, the UE rejects the connection.

For the sake of completeness, an exemplary initial Attach call flow procedure for use with EAP-TLS authentication will now be summarized, particularly for use with a UE, an MME and an SP AAA server. After an RRC connection is established, an initial NAS message is sent from the UE to the MME, which replies with an NAS transport identity message. If the UE has a security context stored for the NH network, it will send the initial NAS message (which may include an Attach request, a tracking area update (TAU) request, service request) integrity protected and including a Globally Unique Temporary UE Identity (GUTI). The NH-MME decides to initiate EAP authentication. In such a case, the MME sends an EAP-REQ/Identity to the UE. Next, an Network Access Identifier (NAI) in an EAP-RSP/Identity is set from the UE to the MME. The user identity may be protected by sending, for example, anonymous@<ServiceProviderRealm>. The use of 'anonymous' username preserves anonymity of user. In this case, the actual UE ID will be in a Client certificate sent later (after TLS Finished), under the TLS protection. In other words, the AAA continues the TLS handshake requesting the Client certificate again, under the protection of established TLS. Various NAS and AAA signals are then exchanged among the UE, MME and AAA, culminating transmission of a TLS certificate from the AAA to the MME and then to the UE. Note that AAA may request that the Client at the UE sends its certificate. The use of either a Manufacturer-provided Device Certificate or a PSP provided User Certificate as a Client Certificate may be PSP policy specific. This policy is provisioned into the UE at the time of setting the subscription with the said PSP. This request may be sent in an EAP-RQ/EAP-TLS:Certificate Request message, and is forwarded from the MME to the UE in the NAS transport.

Next, if a Client Certificate was requested, the UE may return the Client Certificate. That is, the client certificate is sent from the UE to the MME and relayed to the AAA. The choice of either Device or User Certificate may be based on the subscription policy provisioned by the selected PSP. The UE includes the certificate in the EAP-RSP/EAP-TLS transported to the NH-MME over NAS. This response is forwarded to the PSP AAA via a Local AAA Proxy. Both the UE and the AAA generates a master session key (MSK). That is, as a result of successful completion of EAP-TLS procedure, the MSK is computed by the AAA and provided to the authenticator at the NH network. The same MSK is computed at the UE. The EAP Success is then routed to the UE over the NAS transport. Note that both the UE and the MME then derive the $K_{ASME}$ from the MSK.

When EAP-TTLS is used, and the subscription credentials are based on Userid and Password, the MSCHAPv2 is used for subscription authentication as the inner method. The EAP-TTLS client in UE and the EAP-TTLS Server (PSP AAA server) are configured to provide at least minimum support for a selected cryptographic suite. The UE parses the server's X.509 certificate sent to it by the AAA during EAP-TLS. The UE verifies that the PSP FQDN is a suffix match of the domain name in at least one of the DNSName SubjectAltName extensions. If a SubjectAltName of type DNSName is not present, then the domain name from the FQDN shall be a suffix match to the CommonName portion of the SubjectName. If neither of these conditions holds, then verification fails. As with EAP-TLS discussed above, if the EAP-TTLS session is completed successfully (i.e. the UE receives EAP Success), the UE acts depending on the realm match or the mismatch. In case of realm match, i.e. when the PSP FQDN extracted from the AAA certificate matches expected realm of the PSP, when receiving EAP Success, the UE continues the connection procedure. Otherwise, in case of realm mismatch, the UE reject the connection. EAP-TTLS may follow the call flow discussed above for EAP-TLS with suitable modifications. For example, for a start command, the AAA sets the Type to indicate EAP-TTLS and the S (Start) bit set. During client certificate exchange, the UE includes its unique device certificate in the EAP-RSP/EAP-TTLS transported to the MME over NAS, and forwarded to the AAA via a Local AAA Proxy. The device certificate may be provisioned via mechanisms discussed above. The AAA declares EAP failure if the UE does not provide a device certificate. Otherwise, the PSP proceeds as discussed above, culminating in generation of an MSK.

Note that validating the device certificate is a matter of PSP policy. If PSP decides to validate the device certificate then it is expected that the device certificate has a chain to a trust anchor CA certificate, which is trusted by the AAA. If the certificate validation fails, the AAA declares EAP failure. Also, after the MSK is generated and before an EAP success signal is sent by the AAA, the AAA invokes an Inner authentication method based on e.g. MSCHAPv2. When EAP-TTLS is used with MSCHAPv2, the subscriber credential is the identifier and password used for MSCHAPv2. Upon successful completion of authentication based on Inner authentication method, the AAA proceeds to send the EAP-success signal along with the MSK to the MME. These EAP-TLS and EAP-TTLS details are merely exemplary.

As to OSU, subscription for an NH Network access mode can be offered to the UE using the OSU. If the UE does not yet have credentials required to access the NH network, the UE may initiate a limited service state access to the selected NH network to access an OSU provisioning server associated with the NH network. The UE may indicate in an Attach Request its intention to engage with OSU process. Upon receiving the request, the MME establishes a PDN connection for OSU services based on OSU Configuration Data. The default EPS bearer of a PDN Connection associated with the OSU is restricted for OSU session and does not allow any other type of traffic. MME configuration data may include a traffic flow template (TFT) to limit access only to OSU service, or this may be pre-configured into a Packet Gateway (PGW) for the OSU. The TFT may then allow access to used OSU server addresses as needed for OSU server certificate validation. The PDN connection for OSU services is not changed to another type of PDN connection and vice versa. The Nil network blocks any traffic not related to providing OSU service. The NH MME rejects any additional PDN Connection requests. The UE does not request any bearer resource modification for the OSU PDN connection and the NH MME rejects any such attempt.

An OSU client in the UE then initiates a TLS connection to the discovered OSU server URL of the selected OSU PSP. The OSU Server authentication is performed using the OSU server certificates and authorized trust anchor root CA certificates. Validation of the OSU server certificate may follow the HS 2.0 Technical Specification v1.1.0. Once the TLS session is setup between the OSU Client and the OSU server, HTTP-based messages may be exchanged for registration of the user and for provisioning of subscription credentials and other policy related information.

During this exchange, the OSU server may order the UE to open a browser to a provided Uniform Resource Locator (URL) to provide information, such as contact information and payment method, as may be required by the OSU to obtain an account. The UE may then provide the information in an automated manner (e.g., without end user involvement) via optionally embedded registration schema, or the user may manually enter the information. Provisioned credentials and related metadata are then bound to this account. To allow the OSU-attached UE to obtain access to normal services after completion of provisioning procedure, the UE may then explicitly detach and reattach to normal services. These are just some examples of OSU processing.

Insofar as provisioning is concerned, the UE may be configured with a Provisioning Protocol Stack with the following elements: a Control Stack and Provisioning Functions. The Control Plane stack is: a. responsible for discovery of NH networks, the list of service providers and/or a set of public land mobile network (PLMN) IDs of Mobile Network Operators (MNOs) offering service through the NH network; b. responsible for discovery of online provisioning protocol and additional information (such as OSU) for each service provider if available; and c. responsible for setting up a PDN connection for online provisioning. The Provisioning function is: a) potentially part of a credential management function; b) requests the lower layers discovery of possible online provisioning information; c) requests the NAS to establish a PDN connection for provisioning; and d. handles actual provisioning protocol and procedure towards the Provisioning/Online signup server. The UE may also contact the OSU provisioning server via any IP connectivity. The result of the procedure (e.g. credentials and policies provisioned in the UE) may be the same as the procedure described above; that is, the UE can use the provisioned credentials in the same way.

Exemplary System-on-a-Chip Hardware Environment

Aspects of the systems and methods described herein can be exploited using a wide variety of mobile devices or other UEs and for a wide range of applications. To provide a concrete example, an exemplary System-on-a-Chip (SoC) hardware environment will now be described wherein UE components are provided on a SoC processing circuit for use in a mobile communication device or other access terminal.

Figure 10:
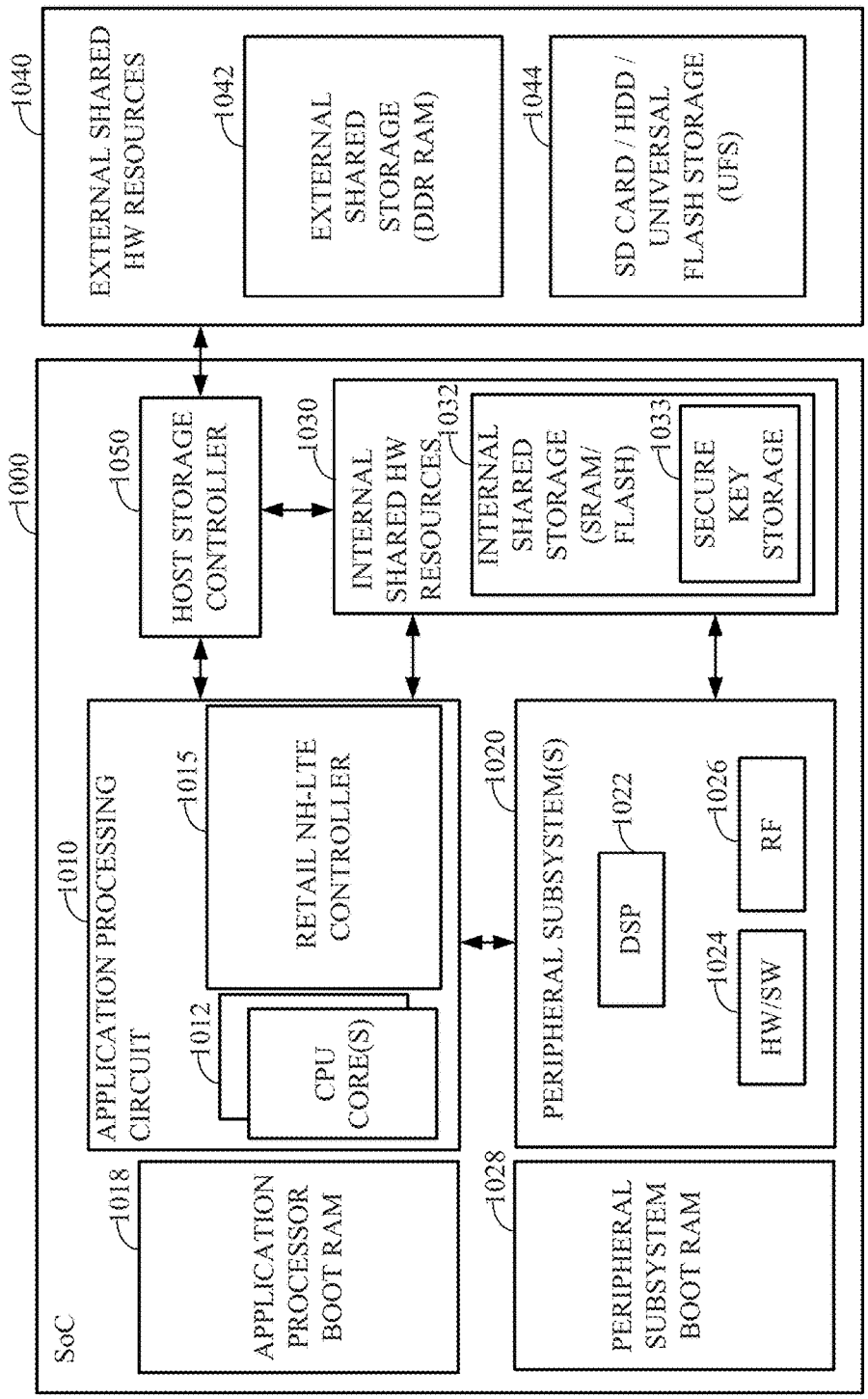
FIG. 10 illustrates an exemplary system-on-a-chip (SoC) of a mobile device (UE) wherein the SoC includes authentication components in accordance with the Retail-based Neutral Host LTE authentication protocol.

FIG. 10 illustrates a SoC processing circuit 1000 of a mobile communication device in accordance with one example where various novel features may be exploited. The SoC processing circuit may be a Snapdragon™ processing circuit of Qualcomm Incorporated. The SoC processing circuit 1000 includes an application processing circuit 1010, which includes a multi-core CPU 1012 and typically controls the operation of all components of the mobile communication device. In this example, the application processing circuit 1010 is equipped to operate in conjunction with a Retail NH-LTE controller 1015. Controller 1015 may be configured or equipped to perform or control the authentication-based operations discussed above of the mobile device, such as obtaining a username and password for authentication, along with a pre-configured mobile device certificate or an SP-issued certificate. The password and the pre-configured mobile device certificate and/or SP-issued certificate, and any private keys used therewith, may be stored within a secure key storage 1033 of an internal shared storage device 1032 so that are only available via secure processing.

In the example of FIG. 10, the application processing circuit 1010 is coupled to a host storage controller 1050 for controlling storage of data in an internal shared storage device 1032 that forms part of internal shared hardware (HW) resources 1030. The application processing circuit 1010 may also include a boot RAM or ROM 1018 that stores boot sequence instructions for the various components of the SoC processing circuit 1000. The SoC processing circuit 1000 further includes one or more peripheral subsystems 1020 controlled by application processing circuit 1010. The peripheral subsystems 1020 may include but are not limited to a storage subsystem (e.g., read-only memory (ROM), random access memory (RAM)), a video/graphics subsystem (e.g., digital signal processing circuit (DSP), graphics processing circuit unit (GPU)), an audio subsystem (e.g., DSP, analog-to-digital converter (ADC), digital-to-analog converter (DAC)), a power management subsystem, security subsystem (e.g., encryption components and digital rights management (DRM) components), an input/output (I/O) subsystem (e.g., keyboard, touchscreen) and wired and wireless connectivity subsystems (e.g., universal serial bus (USB). Global Positioning System (GPS), Wi-Fi. Global System Mobile (GSM), Code Division Multiple Access (CDMA), 4G Long Term Evolution (LTE) modems). The exemplary peripheral subsystem 1020, which is a modem subsystem, includes a DSP 1022, various other hardware (HW) and software (SW) components 1024, and various radio-frequency (RF) components 1026. In one aspect, each peripheral subsystem 1020 also includes a boot RAM or ROM 1028 that stores a primary boot image (not shown) of the associated peripheral subsystems 1020. As noted, the SoC processing circuit 1000 further includes various internal shared HW resources 1030, such as the aforementioned internal shared storage 1032 (e.g. static RAM (SRAM), flash memory, etc.), which is shared by the application processing circuit 1010 and the various peripheral subsystems 1020 to store various runtime data or other parameters and to provide host memory and which may store various keys or passwords for secure processing.

In one aspect, the components 1010, 1018, 1020, 1028 and 1030 of the SoC 1000 are integrated on a single-chip substrate. The SoC processing circuit 1000 further includes various external shared HW resources 1040, which may be located on a different chip substrate and may communicate with the SoC processing circuit 1000 via one or more buses. External shared HW resources 1040 may include, for example, an external shared storage 1042 (e.g. double-data rate (DDR) dynamic RAM) and/or permanent or semi-permanent data storage 1044 (e.g., a secure digital (SD) card, hard disk drive (HDD), an embedded multimedia card, a universal flash device (UFS), etc.), which may be shared by the application processing circuit 1010 and the various peripheral subsystems 1020 to store various types of data, such as an operating system (OS) information, system files, programs, applications, user data, audio/video files, etc. When the mobile communication device incorporating the SoC processing circuit 1000 is activated, the SoC processing circuit begins a system boot up process in which the application processing circuit 1010 may access boot RAM or ROM 1018 to retrieve boot instructions for the SoC processing circuit 1000, including boot sequence instructions for the various peripheral subsystems 1020. The peripheral subsystems 1020 may also have additional peripheral boot RAM or ROM 1028.

Exemplary Systems and Methods

Figure 11:
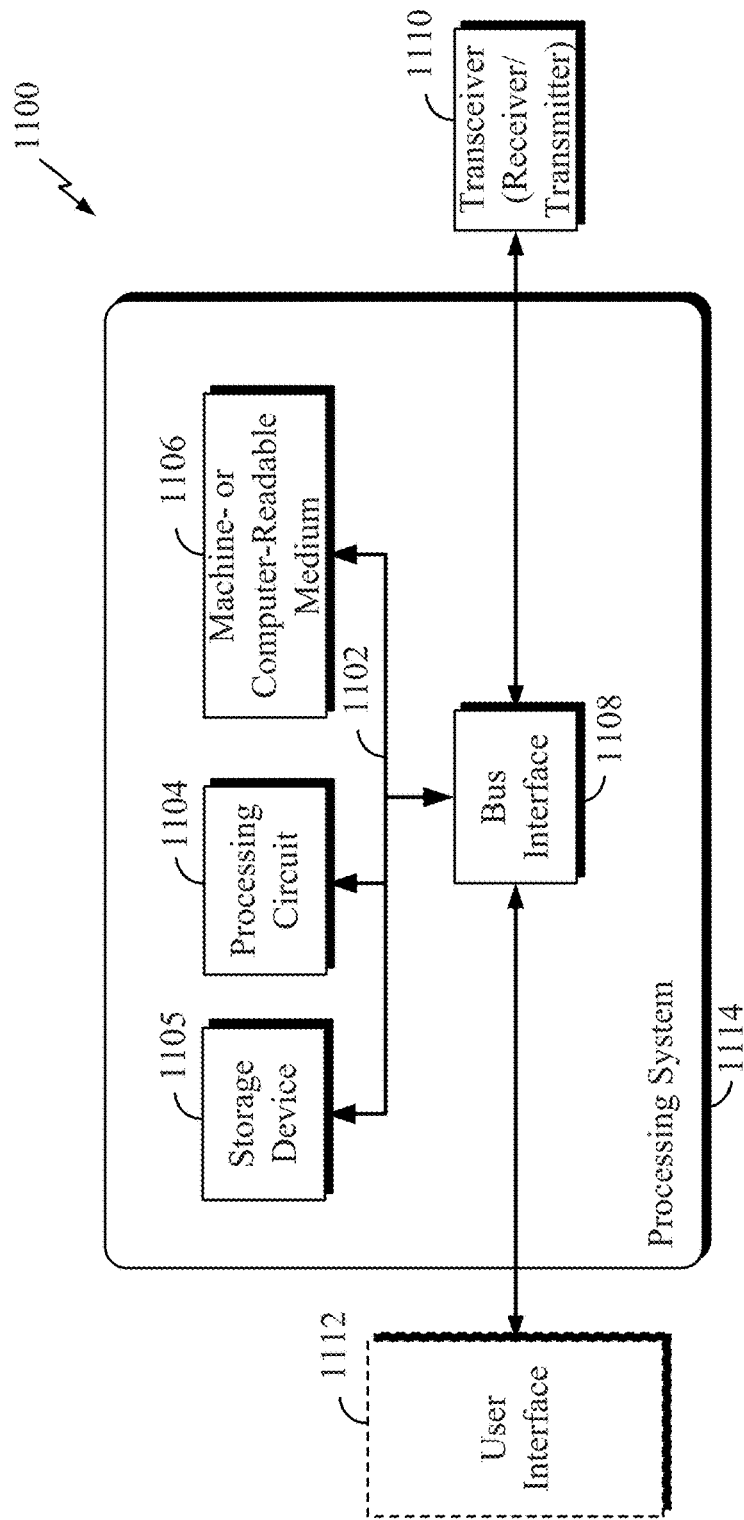
FIG. 11 is a block diagram illustrating an example of a hardware implementation for an apparatus employing a processing system that may exploit the systems, methods and apparatus of FIGS. 3-10.

FIG. 11 illustrates an overall system or apparatus 1100 in which the systems, methods and apparatus of FIGS. 4-10 may be implemented. In accordance with various aspects of the disclosure, an element, or any portion of an element, or any combination of elements may be implemented with a processing system 1114 that includes one or more processing circuits 1104 such as the SoC processing circuit of FIG. 10. For example, apparatus 1100 may be a user equipment (UE) of a mobile communication system. Apparatus 1100 may be used with a radio network controller (RNC). In addition to an SoC, examples of processing circuits 1104 include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104, as utilized in the apparatus 1100, may be used to implement any one or more of the processes described above and illustrated in FIGS. 4, 5, 6, 7, 8, 9 and 10 (and those illustrated in FIGS. 12, 13, 14, 15, 16, 17, 18, 19, 20, 21, 22 and 23, discussed below).

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1106) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1110. The transceiver 1110 provides a means for communicating with various other apparatus over a transmission medium. Depending upon the nature of the apparatus, a user interface 1112 (e.g., keypad, display, speaker, microphone, joystick) may also be provided.

The processing circuit 1104 is responsible for managing the bus 1102 and for general processing, including the execution of software stored on the machine-readable medium 1106. The software, when executed by processing circuit 1104, causes processing system 1114 to perform the various functions described herein for any particular apparatus. Machine-readable medium 1106 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1106. The machine-readable medium 1106 may be a non-transitory machine-readable medium or computer-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1106 may reside in the processing system 1114, external to the processing system 1114, or distributed across multiple entities including the processing system 1114. The machine-readable medium 1106 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1106 may have one or more instructions which when executed by the processing circuit 1104 causes the processing circuit to: obtain UE credentials from a UE including a username, password and a preconfigured UE certificate, wherein a private key corresponding to the UE certificate is available only in secure processing during authentication; authenticate the UE to an online sign up (OSU) component using an OSU certificate and the UE certificate obtained from the UE and forward the UE certificate, the username and the password to an authentication component for further authentication based on an authentication component certificate, the UE certificate and the username and password.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Hence, in one aspect of the disclosure, processing circuit 1104 illustrated in FIG. 11 may be a specialized processing circuit (e.g., an ASIC)) that is specifically designed and/or hard-wired to perform the algorithms, methods, and/or blocks described in FIGS. 4, 5, 6, 7, 8, 9 and 10 (and/or FIGS. 12, 13, 14, 15, 16, 17, 18, 19, 20, 21, 22, 23, 24 and 25, discussed below). Thus, such a specialized processing circuit (e.g., ASIC) may be one example of a means for executing the algorithms, methods, and/or blocks described in FIGS. 4, 5, 6, 7, 8, 9 and 10 (and/or FIGS. 12, 13, 14, 15, 16, 17, 18, 19, 20, 21, 22, 23, 24 and 25, discussed below). The machine-readable storage medium may store instructions that when executed by a specialized processing circuit (e.g., ASIC) causes the specialized processing circuit to perform the algorithms, methods, and/or blocks described herein.

Figure 12:
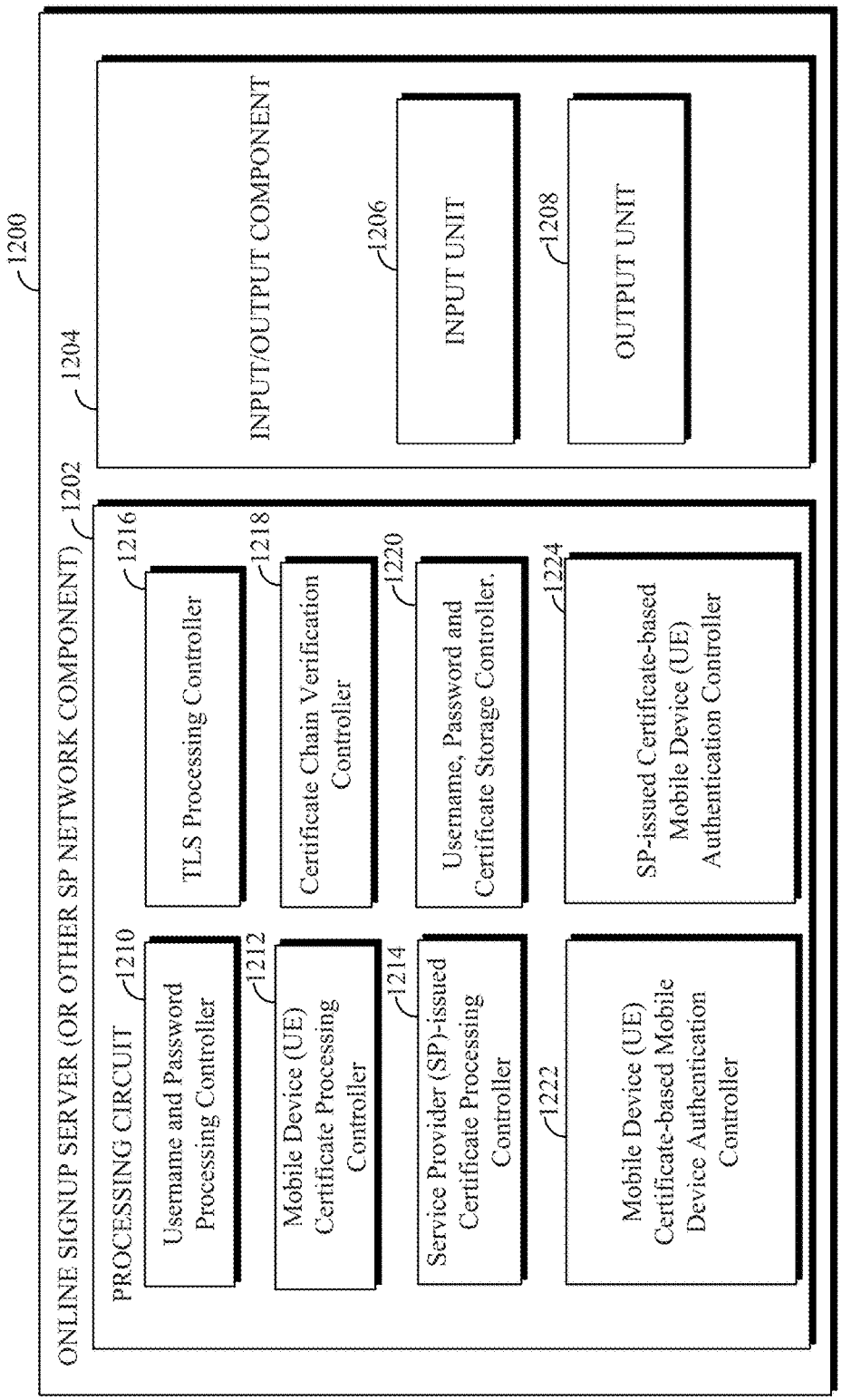
FIG. 12 is a block diagram illustrating exemplary components of an on-line signup (OSU) server or component for use in authentication in accordance with the Retail-based Neutral Host LTE authentication protocol.

FIG. 12 illustrates selected and exemplary components of an OSUL server (or other SP network component) 1200 having a processing circuit 1202 with various components equipped to perform the various OSU-based authentication operations discussed above. The OSU server also includes an input/output component 1204 having an input unit 1206 for inputting or receiving signals or data from other network components and an output unit 1208 for outputting, sending or forwarding signals or data to other network components, such as components shown in FIGS. 1 and 3. In this example, the processing circuit 1202 includes a username and password processing controller 1210 for controlling operations pertaining to receiving and storing the username and password from a mobile device (UE), such as the one of FIG. 13, discussed below, as well as related operations such as controlling the initial selection of a username and password by a user and configuring the username and password for use with the SP. A Mobile Device (UE) Certificate Processing Controller 1212 is provided in at least some examples for controlling operations pertaining to receiving and storing the pre-configured mobile device certificate from a mobile device, as discussed above. An SP-issued Certificate Processing Controller 1214 is provided in at least some examples for controlling operations pertaining to receiving and storing the SP-issued mobile device certificate from a mobile device, as discussed above.

A TLS processing controller 1216 controls TLS-based operations to securely receive data or other signals from the mobile device, such as the password, username and appropriate certificate. If a pre-configured mobile device certificate is used, a Certificate Chain Verification Controller 1218 controls the verification of that the pre-configured mobile device certificate chains to a corresponding trust anchor CA certificate for the mobile device, as already explained. A Username, Password and Certificate Storage Controller 1220 controls the storage of the appropriate username, password and certificate within internal secure memory. For implementations exploiting a pre-configured mobile device certificate, a Mobile Device (UE) Certificate-based Mobile Device Authentication Controller 1222 controls authentication procedures of the OSU server that are based on the mobile device certificate. For implementations exploiting an SP-issued certificate, an SP-issued Certificate-based Mobile Device (UE) Authentication Controller 1422 controls authentication procedures of the OSU server that are based on the SP-issued certificate. As already explained, these operations may be performed in conjunction with an AAA server and hence the procedure may involve forwarding information such as the username, password and appropriate certificate to the AAA server via the output unit 1208. As noted, in some examples, usernames and passwords are not used in the authentication process.

Figure 13:
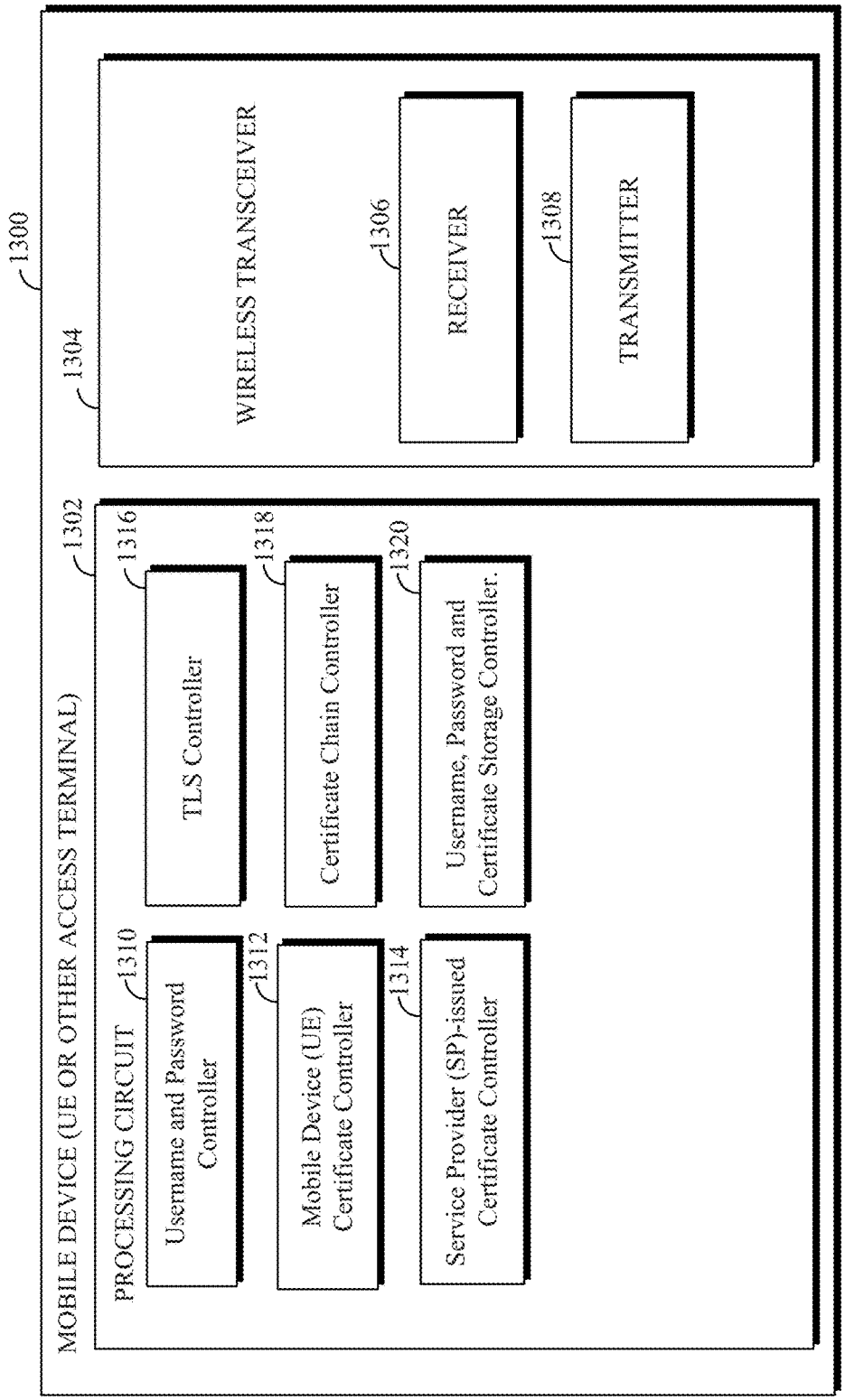
FIG. 13 is a block diagram illustrating exemplary components of a UE for use in authentication in accordance with the Retail-based NH LTE authentication protocol.

FIG. 13 illustrates selected and exemplary components of a mobile device (i.e. a UE or other access terminal) 1300 having a processing circuit 1302 with various components equipped to perform the various mobile device-based authentication operations discussed above. The mobile device also includes a wireless transceiver 1304 having a receiver 1306 for inputting or receiving signals or data via a wireless network (such as the network of FIG. 1) and a transmitter 1308 for outputting, sending or forwarding signals or data via the wireless network. In this example, the processing circuit 1302 includes a username and password processing controller 1310 for controlling operations pertaining to generating and securely storing a username and password for use with the SP. A Mobile Device (UE) Certificate Processing Controller 1312 is provided in at least some examples for controlling operations pertaining to generating and storing a pre-configured mobile device certificate, as discussed above. An SP-issued Certificate Processing Controller 1314 is provided in at least some examples for controlling operations pertaining to receiving and storing the SP-issued mobile device certificate from a mobile device, as discussed above.

A TLS processing controller 1316 controls TLS-based operations to securely transmit data or other signals from the mobile device, such as the password, username and the appropriate certificate. If a pre-configured mobile device certificate is used, a Certificate Chain Verification Controller 1318 controls operations pertaining to processing the aforementioned chain that links the certificate to a corresponding trust anchor CA certificate for the mobile device, as already explained. A Username, Password and Certificate Storage Controller 1320 controls the storage of the appropriate username, password and certificate within internal secure memory. For implementations exploiting a pre-configured mobile device certificate, the username, password and pre-configured certificate are transmitted via the transmitter 1308 in accordance with TLS to an OSU server such as the one of FIG. 12. For implementations exploiting an SP-issued certificate, the SP-issued certificate is transmitted to the OSU server. As noted, in some examples, usernames and passwords are not used in the authentication process.

Figure 14:
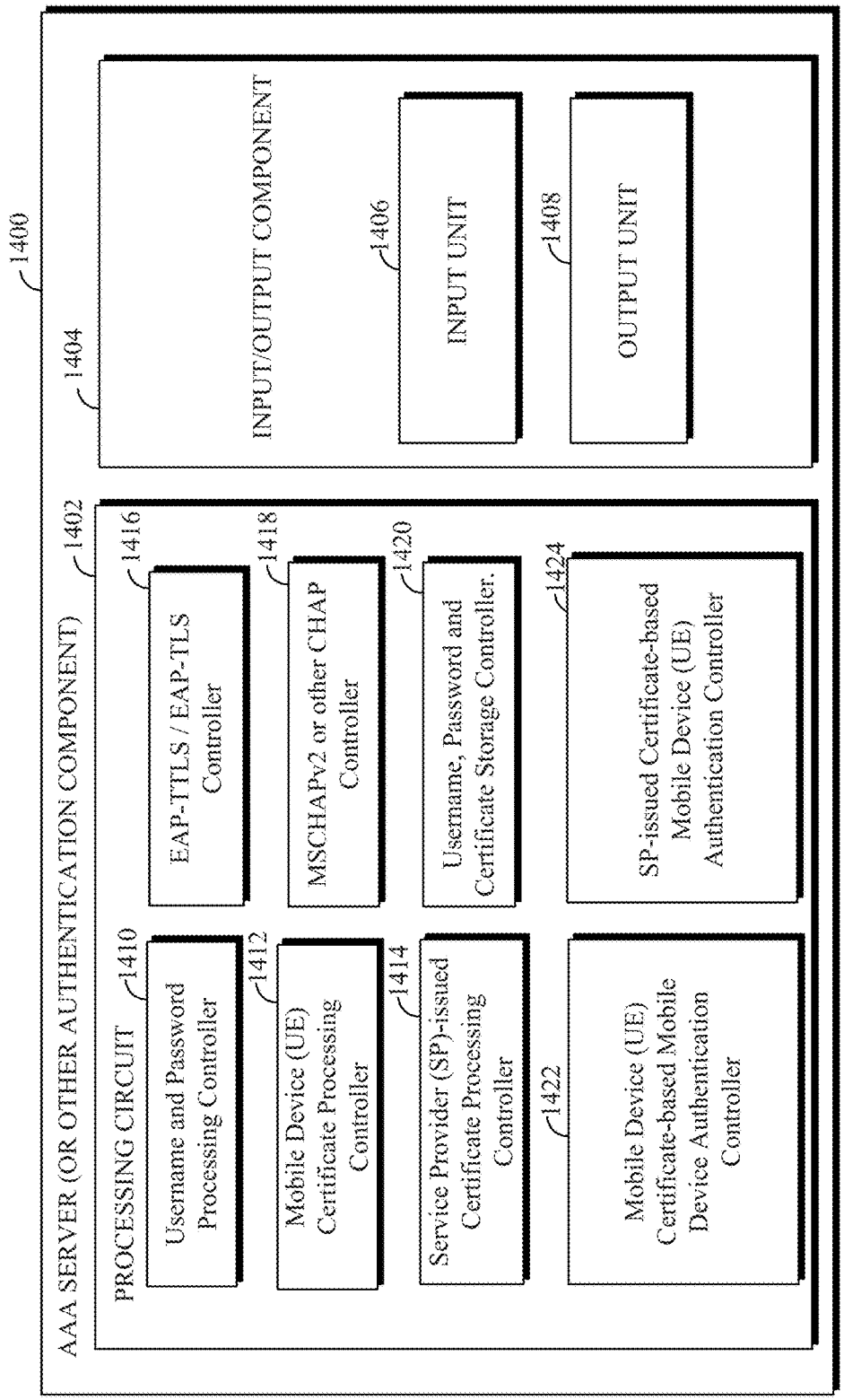
FIG. 14 is a block diagram illustrating exemplary components of an authentication server or component for use in authentication in accordance with the Retail-based Neutral Host LTE authentication protocol.

FIG. 14 illustrates selected and exemplary components of an AAA server (or other SP authentication component) 1400 having a processing circuit 1402 with various components equipped to perform the various AAA-based authentication operations discussed above. The AAA server also includes an input/output component 1404 having an input unit 1406 for inputting or receiving signals or data from other network components such as the OSU server of FIG. 12 and an output unit 1408 for outputting, sending or forwarding signals or data to other network components. In this example, the processing circuit 1402 includes a username and password processing controller 1410 for controlling operations pertaining to receiving and storing the username and password from the OSU server, as discussed below. A Mobile Device (UE) Certificate Processing Controller 1412 is provided in at least some examples for controlling operations pertaining to receiving and processing the pre-configured mobile device certificate associated with a particular UE. An SP-issued Certificate Processing Controller 1414 is provided in at least some examples for controlling operations pertaining to receiving and processing the SP-issued mobile device certificate associated with a particular UE, as also discussed above.

An EAP-TTLS processing controller 1416 controls EAP-TTLS-based and/or EAP-TLS-based operations to securely receive data or other signals. If a username and password is used, an MSCHAPv2 or other CHAP Controller 1418 controls authentication based on CHAP. A Username, Password and Certificate Storage Controller 1420 controls the storage of the username and password (if used) and the appropriate certificate within a secure memory. For implementations exploiting a pre-configured mobile device certificate, a Mobile Device Certificate-based Mobile Device (UE) Authentication Controller 1422 controls authentication procedures of the AAA server that are based on the mobile device certificate. For implementations exploiting an SP-issued certificate, an SP-issued Certificate-based Mobile Device (UE) Authentication Controller 1422 controls authentication procedures of the AAA server that are based on the SP-issued certificate. As already explained, these operations may be performed in conjunction with an OSU server and hence the procedure may involve receiving information such as the username, password and appropriate certificate from the OSU server via the input unit 1406. As noted, in some examples, usernames and passwords are not used in the authentication process.

Any of the various components of FIGS. 12-14 may be replaced with a suitable means for performing or controlling the corresponding operations. Likewise, for implementations where a machine-readable storage medium is exploited or provided, the operations of the various components of FIGS. 12-14 may be represented with a suitable instruction for performing or controlling the corresponding operations.

Figure 15:
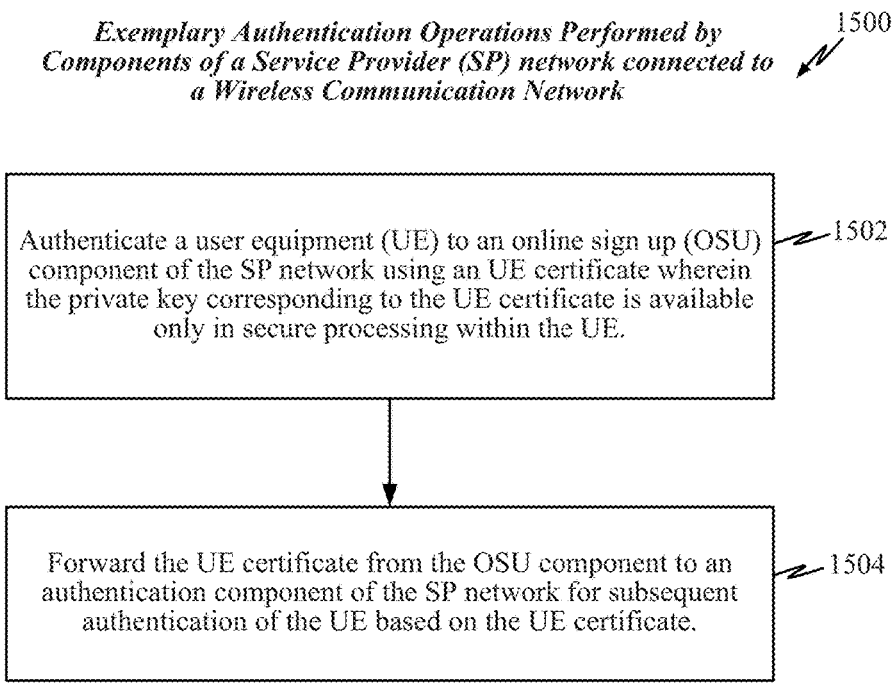
FIG. 15 summarizes exemplary procedures for use in authentication in accordance with the Retail-based Neutral Host LTE authentication protocol.

FIG. 15 broadly illustrates and summarizes methods or procedures 1500 that may be performed by suitably equipped devices or components of an SP network connected to a wireless communication network, such as the OSU server discussed above. At 1502, the device authenticates the UE using a UE certificate wherein a private key corresponding to the UE certificate is available only in secure processing within the UE. At 1504, the device forwards mobile device credentials to an authentication component of the SP network (such as an AAA server) for further authentication of the UE based on the forwarded credentials. As discussed above, the forwarded mobile device credentials may include or comprise one or more of: the UE certificate and the username and password; the SP-issued certificate; or the UE certificate.

Figure 16:
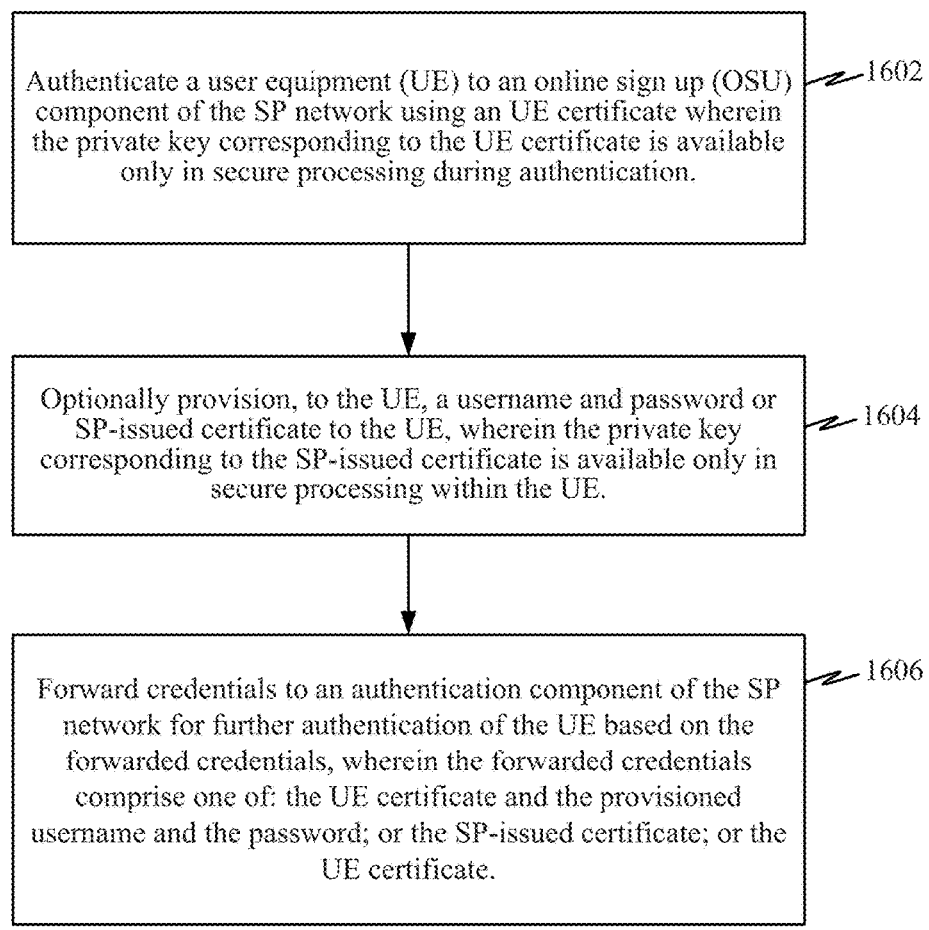
FIG. 16 further summarizes exemplary procedures for use in authentication in accordance with the Retail-based Neutral Host LTE authentication protocol.

FIG. 16 further illustrates and summarizes methods or procedures 1600 that may be performed by suitably equipped devices or components of an SP network connected to a wireless communication network, such as the OSU server discussed above. At 1602, the device authenticates the UE using a UE certificate wherein a private key corresponding to the UE certificate is available only in secure processing during authentication. At 1604, the device optionally provisions or configures, to the UE, a username and password or SP-issued certificate, wherein the private key corresponding to the SP-issued certificate is available only in secure processing within the UE. At 1606, the device forwards mobile device credentials to an authentication component of the SP network (such as an AAA server) for further authentication of the UE based on the forwarded credentials. The forwarded mobile device credentials comprise one of: the UE certificate and the username and password; the SP-issued certificate; or the UE certificate.

Figure 17:
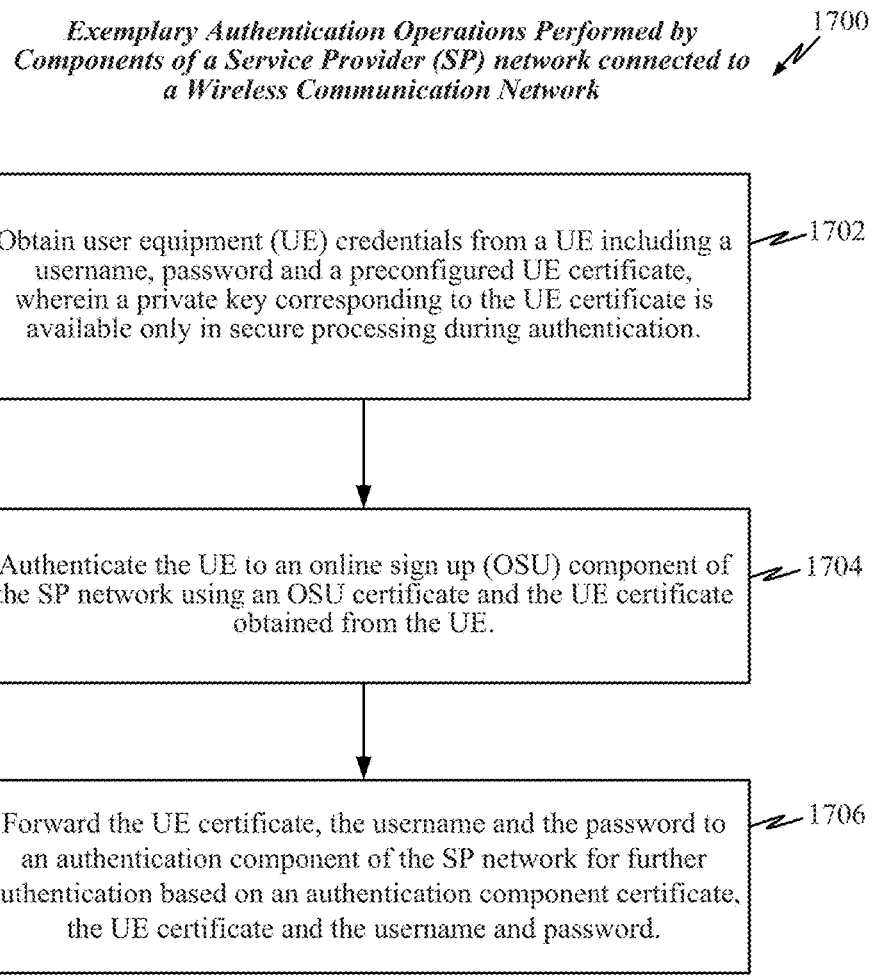
FIG. 17 also summarizes exemplary procedures for use in authentication in accordance with the Retail-based Neutral Host LTE authentication protocol.

FIG. 17 broadly illustrates and summarizes other methods or procedures 1700 that may be performed by suitably equipped devices or components of an SP network connected to a wireless communication network, such as the OSU server discussed above. At 1702, the device obtains user equipment (UE) credentials from a UE including a username, password and a preconfigured UE certificate, wherein a private key corresponding to the UE certificate is available only in secure processing during authentication. At 1704, the device authenticates the UE to an OSU component of the SP network using an OSU certificate and the UE certificate obtained from the UE. At 1706, the device forwards the UE certificate, the username and the password to an authentication component of the SP network (such as an AAA server) for further authentication based on an authentication component certificate, the UE certificate and the username and password.

Figure 18:
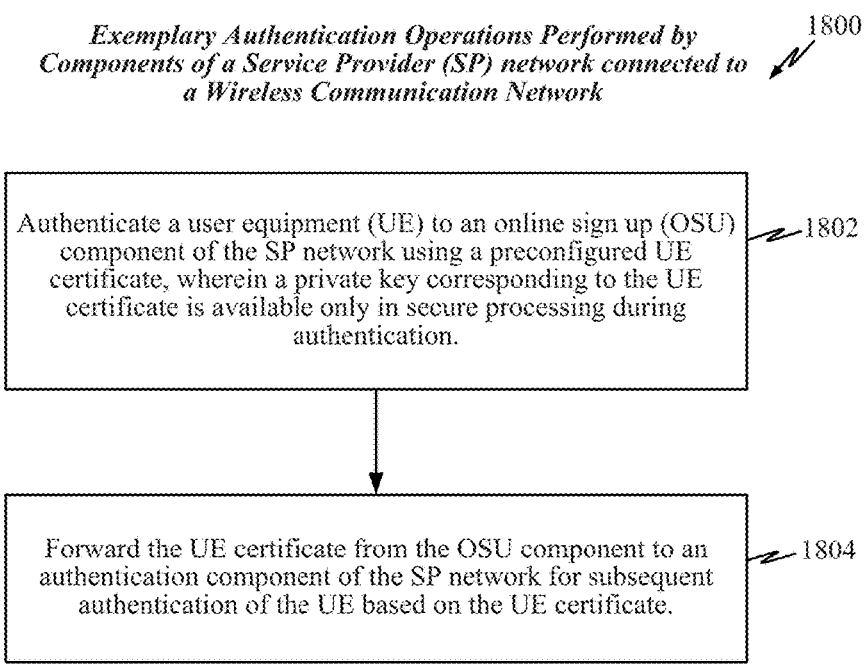
FIG. 18 summarizes exemplary procedures for use in authentication with a preconfigured UE certificate wherein a private key corresponding to the UE certificate is available only in secure processing during authentication.

FIG. 18 broadly illustrates and summarizes methods or procedures 1800 that may be performed by suitably equipped devices or components of an SP network connected to a wireless communication network, such as the OSU server discussed above. At 1802, the UE is authenticated to an OSU component of the SP network using a preconfigured UE certificate wherein a private key corresponding to the UE certificate is available only in secure processing. This embodiment differs from the similar embodiment of FIG. 15 for at least the reason that the embodiment of FIG. 18 indicates the UE certificate is preconfigured. At 1804, the UE certificate is forwarded from the OSU component to an authentication component of the SP network (such as an AAA server) for subsequent authentication of the UE based on the UE certificate. Depending upon the embodiment, the authentication procedure of FIG. 18 may or may not additionally exploit a username/password for authentication, using CHAP or the like.

Figure 19:
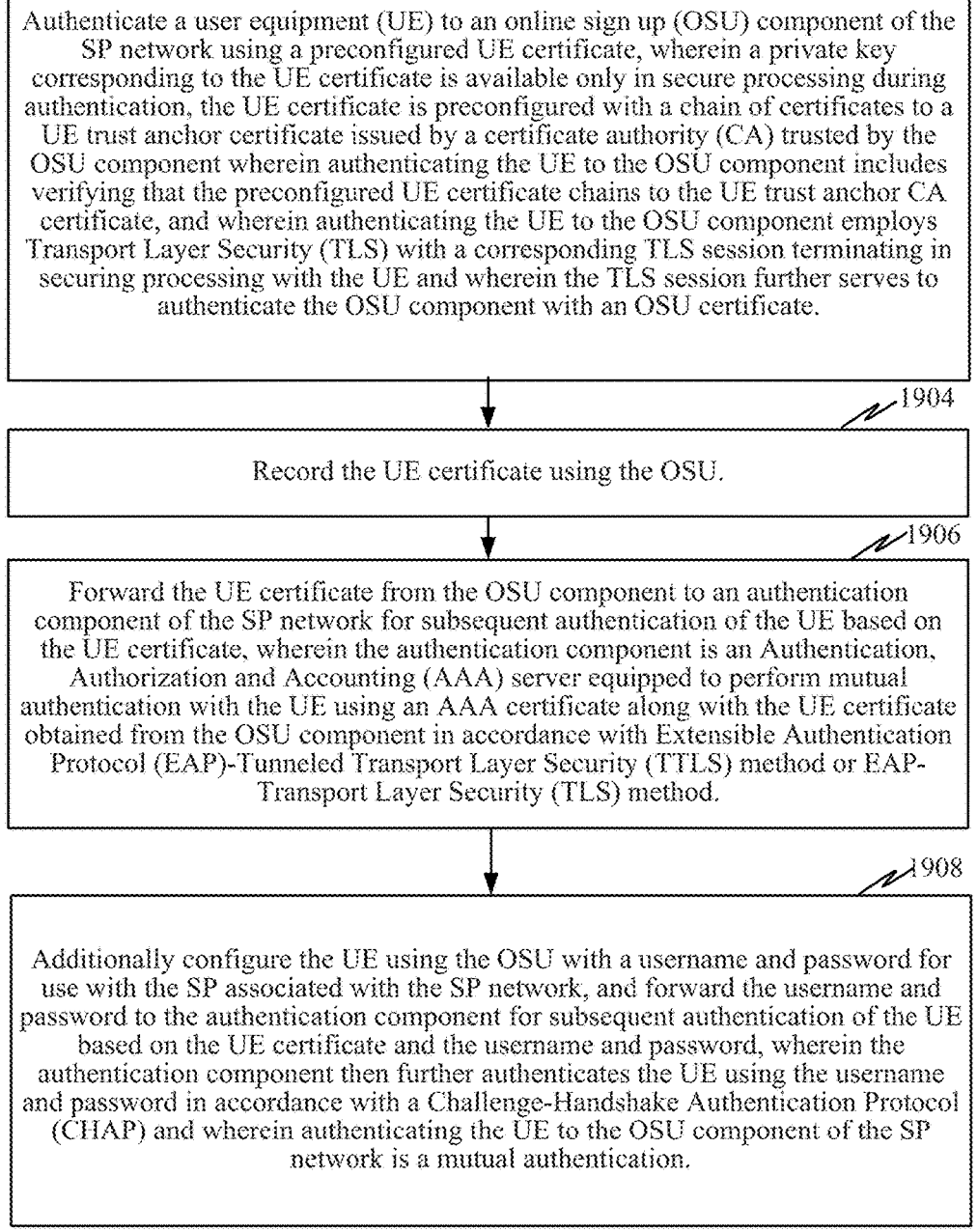
FIG. 19 further summarizes exemplary procedures for use with the authentication procedure of FIG. 18.

FIG. 19 further illustrates and summarizes methods or procedures 1900 that may be performed in accordance with the method of FIG. 18 by suitably equipped devices or components of an SP network connected to a wireless communication network, such as the OSU server discussed above. At 1902, a UE is authenticated to an OSU component of the SP network using a preconfigured UE certificate, wherein a private key corresponding to the UE certificate is available only in secure processing during authentication, the UE certificate is preconfigured with a chain of certificates to a UE trust anchor certificate issued by a CA trusted by the OSU component wherein authenticating the UE to the OSU component includes verifying that the preconfigured UE certificate chains to the UE trust anchor CA certificate, and wherein authenticating the UE to the OSU component employs TLS with a corresponding TLS session terminating in securing processing with the UE and wherein the TLS session further serves to authenticate the OSU component with an OSU certificate. At 1904, the UE certificate is recorded using the OSU.

At 1906, the UE certificate is forwarded from the OSU component to an authentication component of the SP network for subsequent authentication of the UE based on the UE certificate, wherein the authentication component is an AAA server equipped to perform mutual authentication with the UE using an AAA certificate along with the UE certificate obtained from the OSU component in accordance with EAP-TTLS method or EAP-TLS method. Note that, in some examples, two or more AAA servers may be provided. For example, a PSP AAA server may be provided for use with non-USIM credentials associated with a PSP (where PSP refers to a Participating Service Provider and USIM refers to a Universal Subscriber Identify Module), and which may be either internal or external to the NH network. A 3GPP server may be provided for use with USIM credentials that is external to the NH network (where 3GPP refers to the 3rd Generation Partnership Project (3GPP)), and which provides similar functionality as an AAA in a LTE networks.

At 1908, the UE is additionally configured using the OSU with a username and password for use with the SP associated with the SP network, and the username and password is forwarded to the authentication component for subsequent authentication of the UE based on the UE certificate and the username and password, wherein the authentication component then further authenticates the UE using the username and password in accordance with a CHAP and wherein authenticating the UE to the OSU component of the SP network is a mutual authentication. See, above, for more detailed descriptions of exemplary embodiments.

Figure 20:
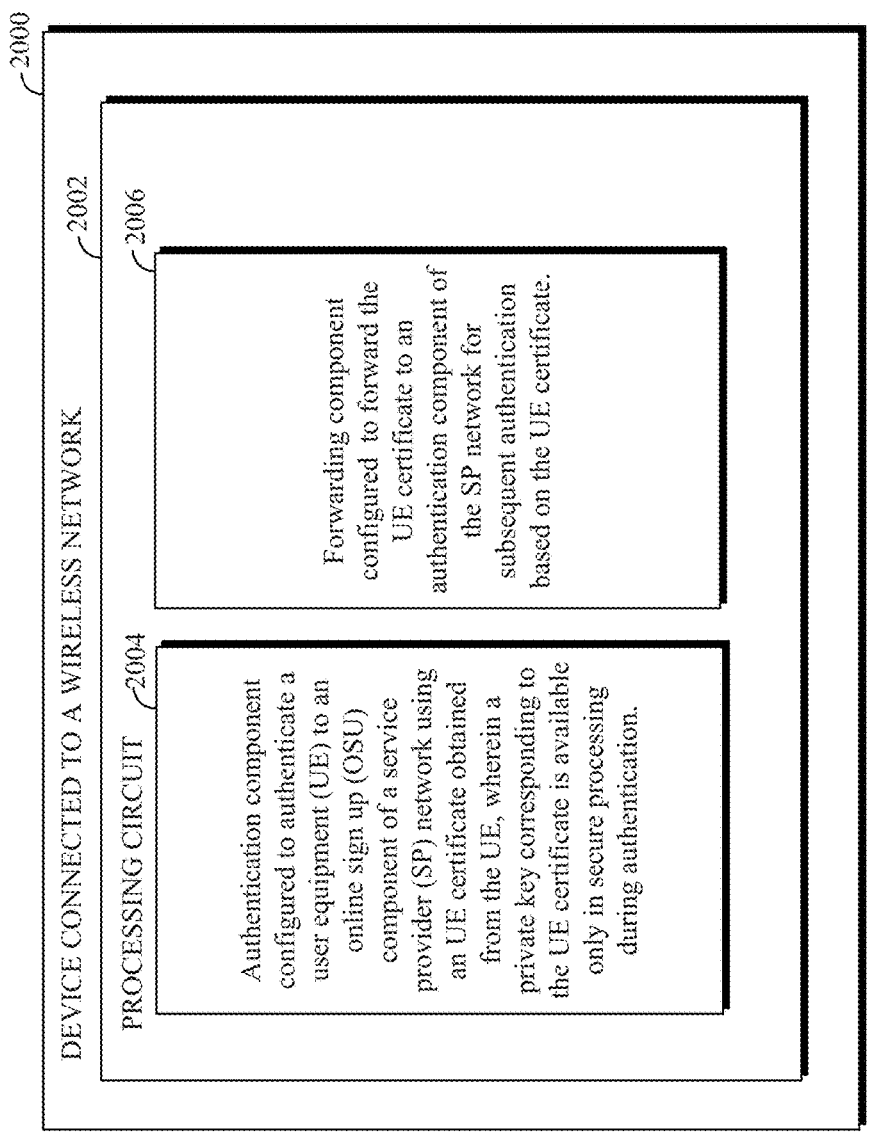
FIG. 20 is a block diagram illustrating exemplary authentication components of a processing circuit of a device connected to a wireless network for use in authentication with a preconfigured UE certificate wherein a private key corresponding to the UE certificate is available only in secure processing during authentication.

FIG. 20 illustrates a device 2000 connected to a wireless network and having a processing circuit 2002 that includes, in this example, an authentication component or sub-circuit 2004 configured to authenticate a user equipment UE to an OSU component (e.g. OSU server) of a SP network using an UE certificate obtained from the UE, wherein a private key corresponding to the UE certificate is available only in secure processing within the UE. (The processing circuit may be, for example, a component of the OSU server such as its controller.) The processing circuit 2002 also includes a forwarding component or sub-circuit configured to forward the UE certificate to an authentication component of the SP network for subsequent authentication based on the UE certificate. See, above, for more detailed descriptions of exemplary embodiments.

FIG. 21 broadly illustrates and summarizes methods or procedures 2100 that may be performed by suitably equipped devices or components of an SP network connected to a wireless communication network, such as the OSU server discussed above. At 2102, the device authenticates a UE to an OSU component of the SP network using a preconfigured UE certificate, wherein a private key corresponding to the UE certificate is available only in secure processing during authentication. At 2104, the OSU component facilitates the provisioning of a SP-issued certificate to the UE, wherein the private key corresponding to the SP-issued certificate is available only in secure processing within the UE. At 2106, the OSU component forwards the SP-issued certificate to an authentication component of the SP network for subsequent authentication of the UE based on the SP-issued certificate.

FIG. 22 further illustrates and summarizes methods or procedures 2200 that may be performed in accordance with the method of FIG. 21 by suitably equipped devices or components of an SP network connected to a wireless communication network, such as the OSU server discussed above. At 2202, the device authenticates a user equipment (UE) to an online sign up (OSU) component of the SP network using a preconfigured user equipment (UE) certificate, wherein a private key corresponding to the UE certificate is available only in secure processing during authentication, the UE certificate is preconfigured with a chain of certificates to a UE trust anchor certificate issued by a certificate authority (CA) trusted by the OSU component, wherein authenticating the UE to the OSU component includes verifying that the preconfigured UE certificate chains to the UE trust anchor CA certificate, wherein authenticating the UE to the OSU component also employs Transport Layer Security (TLS) with a corresponding TLS session terminating in securing processing with the UE, the TLS session further serving to authenticate the OSU component with an OSU certificate. At 2204, the OSU component facilitates the provisioning of a SP-issued certificate to the UE, wherein the private key corresponding to the SP-issued certificate is available only in secure processing within the UE. At 2206, the OSU component forwards the SP-issued certificate to an authentication component of the SP network for subsequent authentication of the UE based on the SP-issued certificate, wherein the authentication component is an AAA server equipped to perform mutual authentication with the UE using an AAA certificate along with the SP-issued certificate obtained from the OSU component in accordance with Extensible Authentication Protocol (EAP)-Tunneled Transport Layer Security (TTLS) method or EAP-Transport Layer Security (TLS) method. See, above, for more detailed descriptions of exemplary embodiments.

Figure 23:
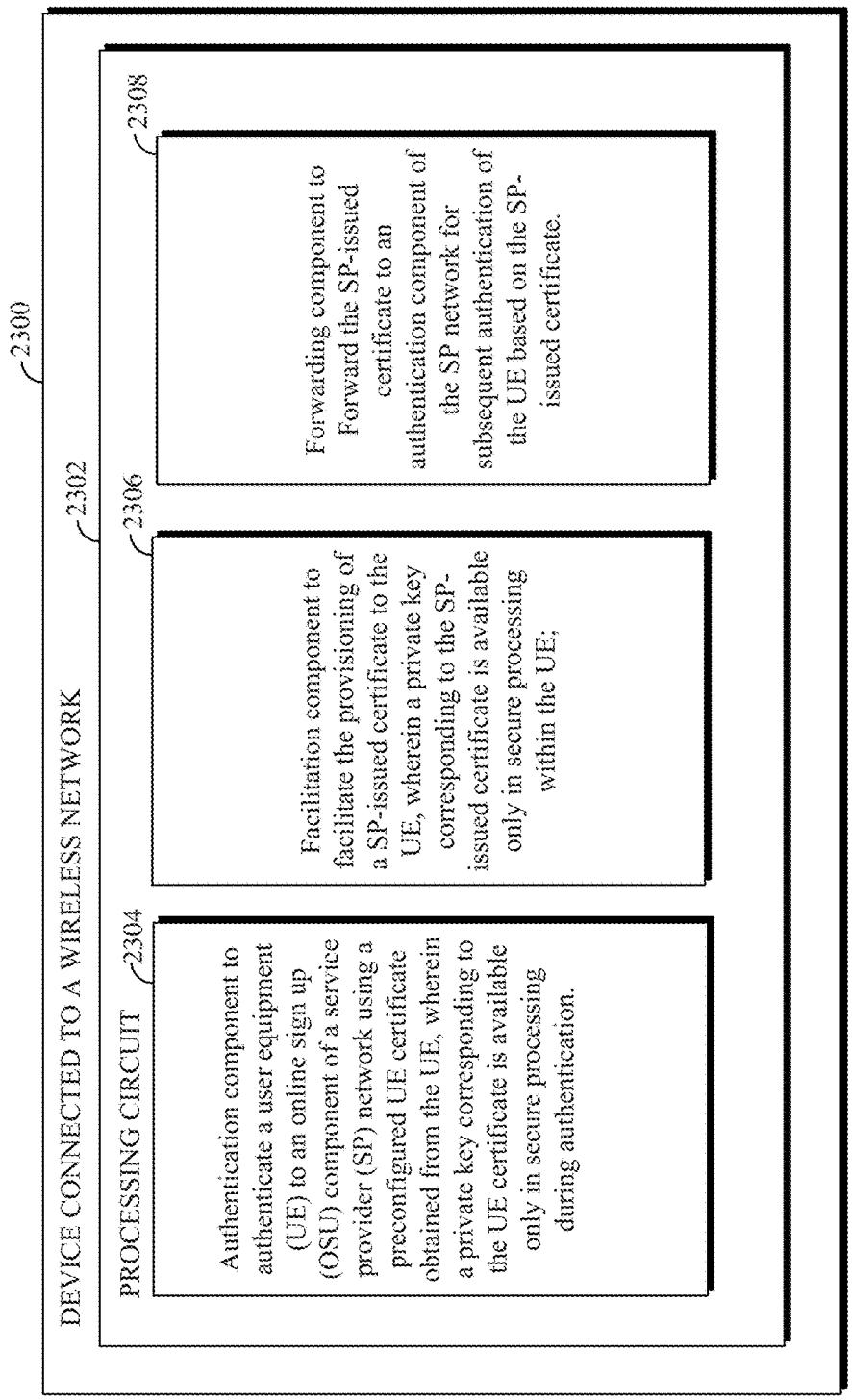
FIG. 23 is a block diagram illustrating exemplary authentication components of a processing circuit of a device connected to a wireless network for use in authentication with a preconfigured UE certificate wherein an OSU component facilitates the provisioning of an SP-issued certificate to the UE.

FIG. 23 illustrates a device 2300 connected to a wireless network and having a processing circuit 2302 that includes, in this example, an authentication component or sub-circuit 2304 configured to authenticate a user equipment (UE) to an online sign up (OSU) component of a service provider (SP) network using a preconfigured UE certificate obtained from the UE, wherein a private key corresponding to the UE certificate is available only in secure processing during authentication. The processing circuit 2302 also includes a facilitation component or sub-circuit 2306 configured to facilitate the provisioning of a SP-issued certificate to the UE, wherein a private key corresponding to the SP-issued certificate is available only in secure processing within the UE. A forwarding component 2308 is configured to forward the SP-issued certificate to an authentication component of the SP network for subsequent authentication of the UE based on the SP-issued certificate. See, above, for more detailed descriptions of exemplary embodiments.

Figure 24:
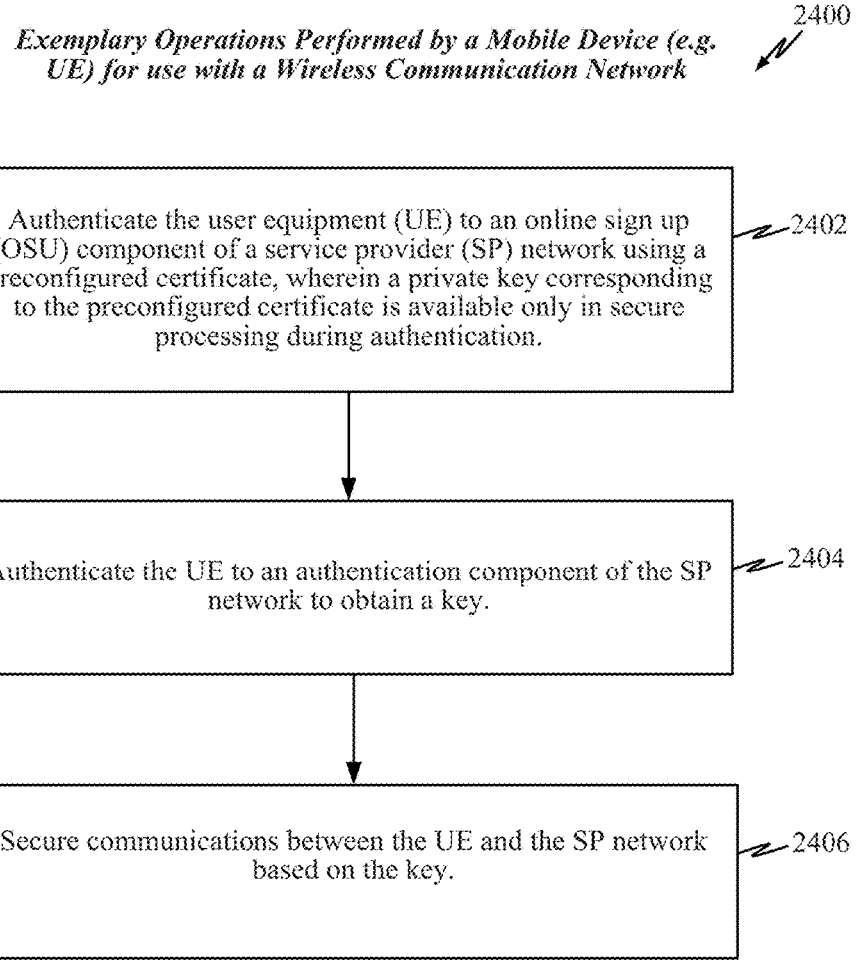
FIG. 24 summarizes exemplary procedures for use by the UE.

FIG. 24 broadly illustrates and summarizes devices, methods or procedures 2400 that may be performed by a suitably equipped mobile device or UE for use with a wireless communication network. At 2402, the UE authenticates to an OSU component of a SP network (or other cellular network) using a preconfigured certificate, where a private key corresponding to the preconfigured certificate is available only in secure processing during authentication. At 2402, the UE authenticates to an authentication component of the SP network (such as an AAA server) to obtain a key (such as a master key, MSK). At 2406, communications are secured between the UE and the SP network (or other cellular network) based on the key (such as by using the MSK to generate one or more SP-network-specific keys, Kasme). In some examples, a device is provided that includes a processing circuit of a UE (for use with a wireless communication network), wherein the processing circuit is configured to authenticate the UE to an online sign up (OSU) component of a service provider (SP) network using a preconfigured certificate, wherein a private key corresponding to the preconfigured certificate is available only in secure processing during authentication; authenticate the UE to an authentication component of the SP network to obtain a key; and secure communications between the UE and the SP network based on the key. See, above, for more detailed descriptions of exemplary method and device embodiments.

Figure 25:
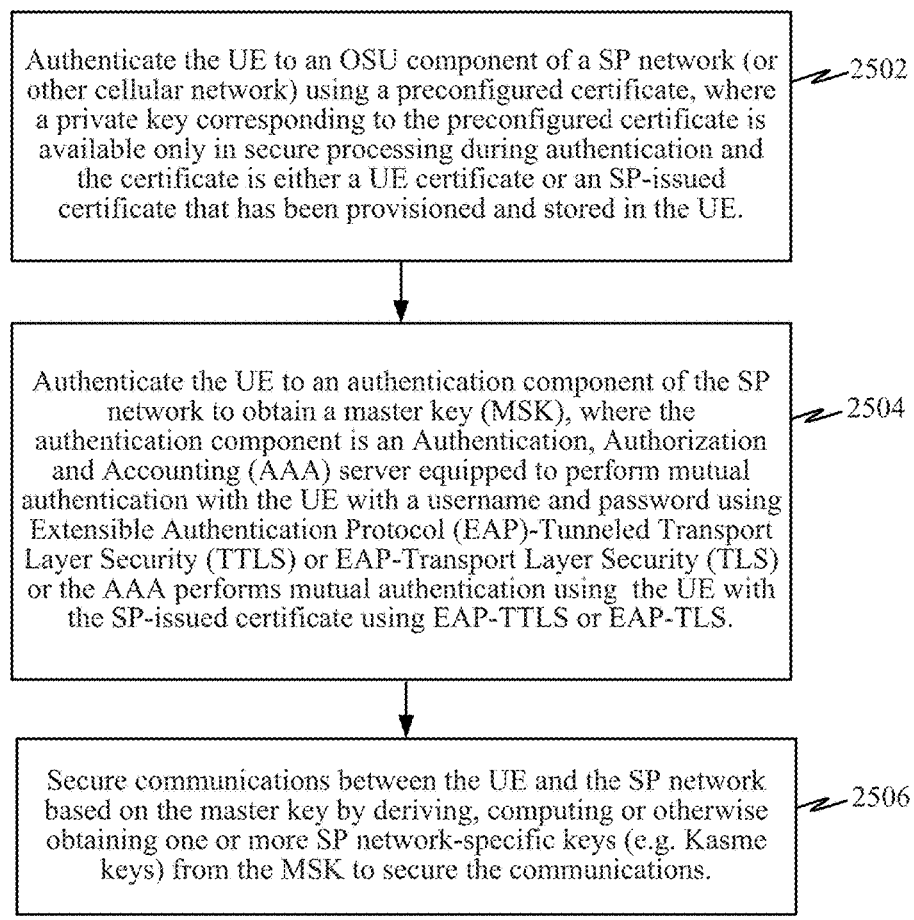
FIG. 25 further summarizes exemplary procedures for use by the UE.

FIG. 25 further illustrates and summarizes devices, methods or procedures 2500 that may be performed by a suitably equipped mobile device or UE for use with a wireless communication network. At 2502, the UE authenticates to an OSU component of a SP network (or other cellular network) using a preconfigured certificate, where a private key corresponding to the preconfigured certificate is available only in secure processing during authentication and the certificate is either a UE certificate or an SP-issued certificate that has been provisioned and stored in the UE. At 2504, the UE authenticates to an authentication component of the SP network to obtain a master key (MSK), where the authentication component is an AAA server equipped to perform mutual authentication with the UE with a username and password using EAP-TTLS or EAP-TLS or the AAA performs mutual authentication with the UE using the SP-issued certificate using EAP-TLS or EAP-TLS. At 2506, the UE secures communications between the UE and the SP network based on the master key (MSK) by deriving, computing or otherwise obtaining one or more SP network-specific keys (e.g. Kasme keys) from the MSK to secure the communications. See, above, for more detailed descriptions of exemplary method and device embodiments.

Note that aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
a processing circuit of a user equipment (UE) for use with a wireless communication network, the processing circuit configured to
mutually authenticate the UE with an online sign up (OSU) component of a service provider (SP) network using an OSU-certificate and a preconfigured UE certificate, wherein a private key corresponding to the preconfigured UE certificate is available only in secure processing during authentication;
obtain an SP-issued certificate, facilitated by the OSU component, where a private key corresponding to the SP-certificate is available only in secure processing within the UE;
authenticate the UE to an authentication component of the SP network to obtain a master key; and
secure communications between the UE and the SP network based on the master key.

2. The device of claim 1, wherein the processing circuit is configured to secure communications between the UE and the SP network by securing communications with one or more access points.

3. The device of claim 1, wherein communications between the UE and the SP network are secured based on the master key by obtaining one or more SP network-specific keys to secure the communications.

4. The device of claim 1, wherein the authentication component is an Authentication, Authorization and Accounting (AAA) server and wherein the processing circuit is configured to authenticate the UE to the AAA with a username and password using Extensible Authentication Protocol (EAP)-Tunneled Transport Layer Security (TTLS) or EAP-Transport Layer Security (TLS).

5. The device of claim 1, wherein the authentication component is an Authentication, Authorization and Accounting (AAA) server and wherein the processing circuit is configured to authenticate the UE to the AAA with the SP-issued certificate using Extensible Authentication Protocol (EAP)-Tunneled Transport Layer Security (TTLS) or EAP-Transport Layer Security (TLS).

6. The device of claim 1, wherein the UE certificate is preconfigured with a chain of certificates to a UE trust anchor certificate issued by a certificate authority (CA) trusted by the OSU component.

7. The device of claim 1, wherein the processing circuit is configured to mutually authenticate the UE to the OSU component using Transport Layer Security (TLS) with a corresponding TLS session terminating in securing processing with the UE.

8. The device of claim 1, wherein the processing circuit is further configured to authenticate the UE to the authentication component using a username and a password in accordance with a Challenge-Handshake Authentication Protocol (CHAP).

9. The device of claim 1, wherein the private key corresponding to the preconfigured UE certificate is available within the UE only within a secure hardware mode of operation of the UE.

10. The device of claim 1, wherein the private key corresponding to the preconfigured UE certificate is available within the UE only to a secure hardware element of the UE that is distinct from an application processor of the UE.

11. The device of claim 1, wherein the private key corresponding to the preconfigured UE certificate is not directly available to a high level operating system (HLOS) of a processor of the UE.

12. A method operational in a user equipment (UE) of a wireless communication network, comprising:
mutually authenticating the UE with an online sign up (OSU) component of a service provider (SP) network using an OSU-certificate and a preconfigured UE certificate, wherein a private key corresponding to the preconfigured UE certificate is available only in secure processing during authentication;
obtaining an SP-issued certificate, facilitated by the OSU component, where a private key corresponding to the SP-certificate is available only in secure processing within the UE;
authenticating the UE to an authentication component of the SP network to obtain a master key; and
securing communications between the UE and the SP network based on the master key.

13. The method of claim 12, wherein securing communications between the UE and the SP network comprises securing communications with one or more access points.

14. The method of claim 12, wherein communications between the UE and the SP network are secured based on the master key by obtaining one or more SP network-specific keys to secure the communications.

15. The method of claim 12, wherein the authentication component is an Authentication, Authorization and Accounting (AAA) server, and wherein authenticating the UE to the authentication component comprises authenticating the UE to the AAA with a username and password using Extensible Authentication Protocol (EAP)-Tunneled Transport Layer Security (TTLS) or EAP-Transport Layer Security (TLS).

16. The method of claim 12, wherein the authentication component is an Authentication, Authorization and Accounting (AAA) server, and wherein authenticating the UE to the authentication component comprises authenticating the UE to the AAA with the SP-issued certificate using Extensible Authentication Protocol (EAP)-Tunneled Transport Layer Security (TTLS) or EAP-Transport Layer Security (TLS).

17. The method of claim 12, wherein the UE certificate is preconfigured with a chain of certificates to a UE trust anchor certificate issued by a certificate authority (CA) trusted by the OSU component.

18. The method of claim 12, wherein mutually authenticating the UE to the OSU component is performed using Transport Layer Security (TLS) with a corresponding TLS session terminating in securing processing with the UE.

19. The method of claim 12, wherein the UE is authenticated to the authentication component using a username and a password in accordance with a Challenge-Handshake Authentication Protocol (CHAP).

20. The method of claim 12, wherein the private key corresponding to the preconfigured UE certificate is available within the UE only within a secure hardware mode of operation of the UE.

21. The method of claim 12, wherein the private key corresponding to the preconfigured UE certificate is available within the UE only to a secure hardware element of the UE that is distinct from an application processor of the UE.

22. The method of claim 12, wherein the private key corresponding to the preconfigured UE certificate is not directly available to a high level operating system (HLOS) of a processor of the UE.

23. A non-transitory processor-readable medium having one or more instructions which when executed by at least one processing circuit of a user equipment (UE) causes the at least one processing circuit of the UE to:
mutually authenticate the UE with an online sign up (OSU) component of a service provider (SP) network using an OSU-certificate and a preconfigured UE certificate, wherein a private key corresponding to the preconfigured UE certificate is available only in secure processing during authentication;
obtain an SP-issued certificate, facilitated by the OSU component, where a private key corresponding to the SP-certificate is available only in secure processing within the UE;
authenticate the UE to an authentication component of the SP network to obtain a master key; and
secure communications between the UE and the SP network based on the master key.

24. The non-transitory processor-readable medium of claim 23, further comprising instructions for securing communications with one or more access points.

25. The non-transitory processor-readable medium of claim 23, further comprising instructions for securing the communications based on the master key by obtaining one or more SP network-specific keys to secure the communications.

26. The non-transitory processor-readable medium of claim 23, wherein the authentication component is an Authentication, Authorization and Accounting (AAA) server, and wherein the processor-readable medium further comprises instructions for authenticating the UE to the AAA with a username and password using Extensible Authentication Protocol (EAP)-Tunneled Transport Layer Security (TTLS) or EAP-Transport Layer Security (TLS).

27. The non-transitory processor-readable medium of claim 23, wherein the private key corresponding to the preconfigured UE certificate is available within the UE only within a secure hardware mode of operation of the UE.

28. The non-transitory processor-readable medium of claim 23, wherein the private key corresponding to the preconfigured UE certificate is available within the UE only to a secure hardware element of the UE that is distinct from an application processor of the UE.

29. The non-transitory processor-readable medium of claim 23, wherein the private key corresponding to the preconfigured UE certificate is not directly available to a high level operating system (HLOS) of a processor of the UE.

30. An apparatus for use as a component of a user equipment (UE) of a wireless communication network, comprising:
means for mutually authenticating the UE with an online sign up (OSU) component of a service provider (SP) network using an OSU-certificate and a preconfigured UE certificate, wherein a private key corresponding to the preconfigured UE certificate is available only in secure processing during authentication;
means for obtaining an SP-issued certificate, facilitated by the OSU component, where a private key corresponding to the SP-certificate is available only in secure processing within the UE;
means for authenticating the UE to an authentication component of the SP network to obtain a master key; and
means for securing communications between the UE and the SP network based on the master key.

* * * * *